United States Patent
Takahashi

(10) Patent No.: US 7,113,349 B2
(45) Date of Patent: Sep. 26, 2006

(54) DECENTERING OPTICAL SYSTEM AND OPTICAL SYSTEM USING THE SAME

(75) Inventor: Koichi Takahashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 11/210,746

(22) Filed: Aug. 25, 2005

(65) Prior Publication Data

US 2006/0152821 A1 Jul. 13, 2006

(30) Foreign Application Priority Data

Aug. 30, 2004 (JP) .......................... P 2004-250705

(51) Int. Cl.
*G02B 17/00* (2006.01)
*G02B 27/14* (2006.01)

(52) U.S. Cl. ...................... 359/726; 359/637; 359/631; 359/630

(58) Field of Classification Search ................. 359/726, 359/637, 631, 630, 632, 633, 636, 640, 833
See application file for complete search history.

(56) References Cited

U.S. PATENT DOCUMENTS 5,701,202 A 12/1997 Takahashi
5,875,056 A 2/1999 Takahashi
6,018,423 A 1/2000 Takahashi
6,195,207 B1 2/2001 Takahashi
6,317,267 B1 11/2001 Takahashi

FOREIGN PATENT DOCUMENTS

JP 08-313829 11/1996
JP 2000-105338 A 4/2000

*Primary Examiner*—Timothy Thompson
(74) *Attorney, Agent, or Firm*—Kenyon & Kenyon LLP

(57) ABSTRACT

A decentering optical system which takes a substantially parallel beam as input light, includes a prism having a medium whose refractive index is greater than 1, and four optical surfaces disposed at boundary surfaces of the medium so as to be mutually decentering or to slant. The four optical surfaces form a light-incident surface through which the input light enters, at least two internal-reflective surfaces which reflect internally the input light entering inside, a splitting surface which splits an optical path of the input light reflected by any one of these internal-reflective surfaces, into a transmission optical path and a reflection optical path; and a transmitting surface which emits the input light traveling along the reflection optical path towards an exterior. Real images are formed along each of the transmission optical path and the reflection optical path.

7 Claims, 9 Drawing Sheets

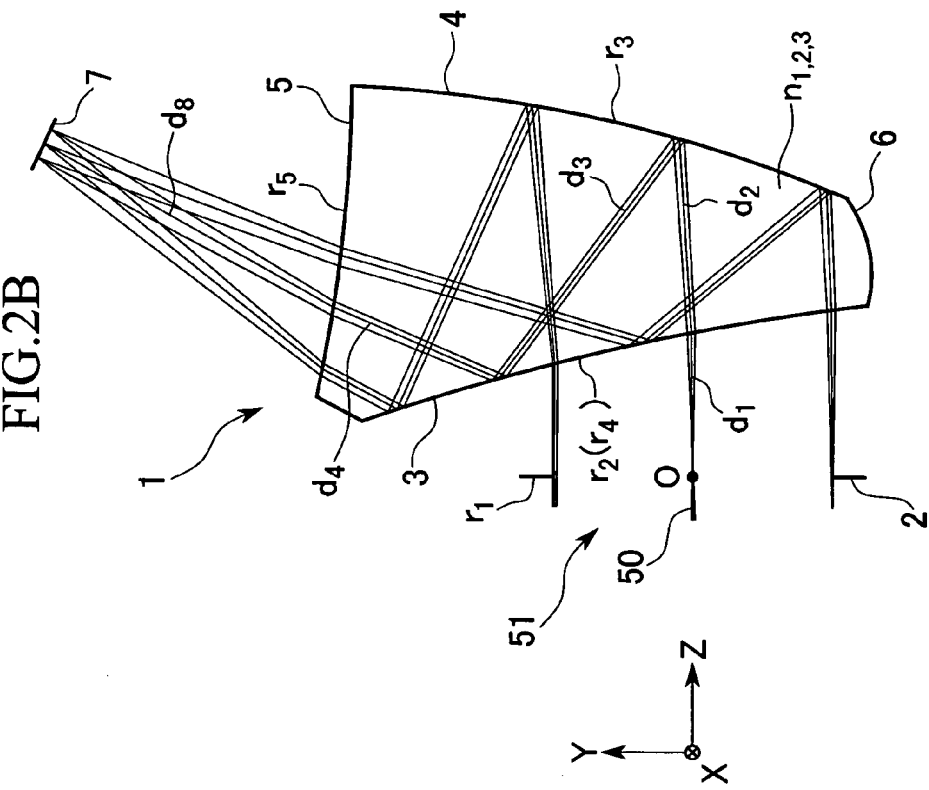
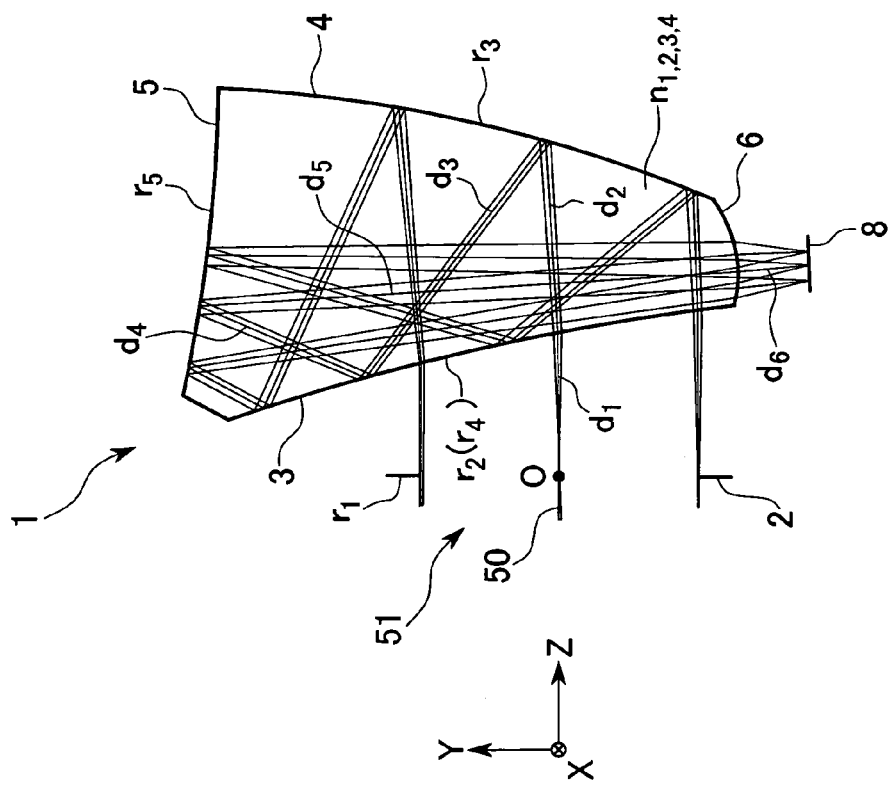

DECENTERING OPTICAL SYSTEM AND OPTICAL SYSTEM USING THE SAME

BACKGROUND OF THE INVENTION

Priority is claimed on Japanese Patent Application No. 2004-250705, filed Aug. 30, 2004, the contents of which are incorporated herein by reference.

1. Field of the Invention

The present invention relates to a decentering optical system and an optical system using the same. The present invention relates to, for example, a decentering optical system which is preferable for emitting a substantially parallel beam or for focusing on a focal point surface, and an optical system using the same.

2. Description of the Related Art

In the past, there have per se been known various kinds of reflection optical systems which are decentering optical systems in which reflective surfaces are combined together so as to be mutually decentering or to slant.

For example, in FIGS. 1, 4, and 6 of Japanese Unexamined Patent Application, First Publication No. H08-313829 (hereinafter "patent document 1"), and in FIGS. 1 to 24 of Japanese Unexamined Patent Application, First Publication No. 2000-105338 (hereinafter "patent document 2"), a prism type is disclosed as this kind of reflection optical system. Furthermore, optical systems in which such optical systems are combined with light reception elements and display devices are also disclosed.

Patent document 1 discloses an ocular optical system formed of a prism having decentering reflective surfaces, and having an arrangement in which, when it is seen from a reverse-light-tracking direction, an observation light entering through a first surface is reflected internally toward the first surface by a second surface, and then is reflected internally from the first surface towards a third surface, thereby being folded into a Z-shaped optical path, and then the observation light forms a real image at the exterior of the prism.

Patent document 2 discloses a prism element having five optical surfaces, wherein observation light entering through a first surface is reflected internally towards the first surface by a second surface, is then reflected internally towards a third surface by the first surface thereby forming an intermediate image within the prism element, is then reflected internally by the third surface, is then reflected internally by a fourth surface, and is thereafter reflected internally by a fifth surface thereby forming an image surface. That is, a prism element is disclosed which relays an intermediate image through the optical surfaces after the third surface.

In addition, an arrangement having four optical surfaces in which the third surface also serves as the fifth surface is disclosed.

SUMMARY OF THE INVENTION

A decentering optical system of the present invention is a decentering optical system which takes a substantially parallel beam as input light, including a prism having a medium whose refractive index is greater than 1, and four optical surfaces disposed at boundary surfaces of the medium so as to be mutually decentering or to slant. The four optical surfaces form: a light-incident surface through which the input light enters; at least two internal-reflective surfaces which reflect internally the input light entering inside; a splitting surface which splits an optical path of the input light reflected by any one of these internal-reflective surfaces into a transmission optical path and a reflection optical path; and a transmitting surface which emits the input light traveling along the reflection optical path towards an exterior. Real images are formed along each of the transmission optical path and the reflection optical path.

It may be arranged such that when the four optical surfaces are defined, in order of appearance from the first time along one optical path in which the input light travels, as a first surface, a second surface, a third surface, and a fourth surface, if it is configured such that: the first surface forms the light-incident surface and one of the internal-reflective surfaces; the second surface forms another of the internal-reflective surfaces; the third surface forms the splitting surface; and the fourth surface forms the transmitting surface, the one optical path includes an optical path in which the input light passing through the first surface is reflected internally by the second surface and travels towards the first surface, and then is reflected internally by the first surface and travels towards the third surface.

At least two of the four optical surfaces may be formed by rotationally asymmetric surfaces.

It may be arranged such that: the real image includes a first real image formed at an exterior of the prism along the transmission optical path, and a second real image formed at an interior of the prism along the reflection optical path; and light emitted from the transmitting surface after forming the second real image becomes substantially parallel light, thereby forming an exit pupil at the exterior of the prism.

The decentering optical system may further include a light-condensing element disposed on an optical path after forming the exit pupil, and a light-receiving device disposed at a condensing position of the light-condensing element.

When a paraxial focal length is termed F, and an entrance pupil diameter is termed D, the following Equation (1) may be satisfied:

$$1 \leq F/D \leq 10 \qquad (1)$$

An optical system of the present invention may include a light-receiving device which receives a substantially parallel light entering from an exterior thereof, as input light, wherein the light-receiving device includes the above-mentioned decentering optical system.

BRIEF DESCRIPTION OF THE DRAWINGS

FIGS. 2A and 2B are optical path diagrams in which a reflection optical path and a transmission optical path shown in FIG. 1 are shown separately from one another.

DETAILED DESCRIPTION OF THE INVENTION

Each embodiment of the present invention will be explained in the following with reference to the figures. In all these figures, members which are the same as or which correspond to one another will be explained using the same symbols even though the embodiments thereof are different to each other, and duplicate explanations thereof will be omitted.

First Embodiment

The decentering optical system according to a first embodiment of the present invention will be explained.

Figure 1:
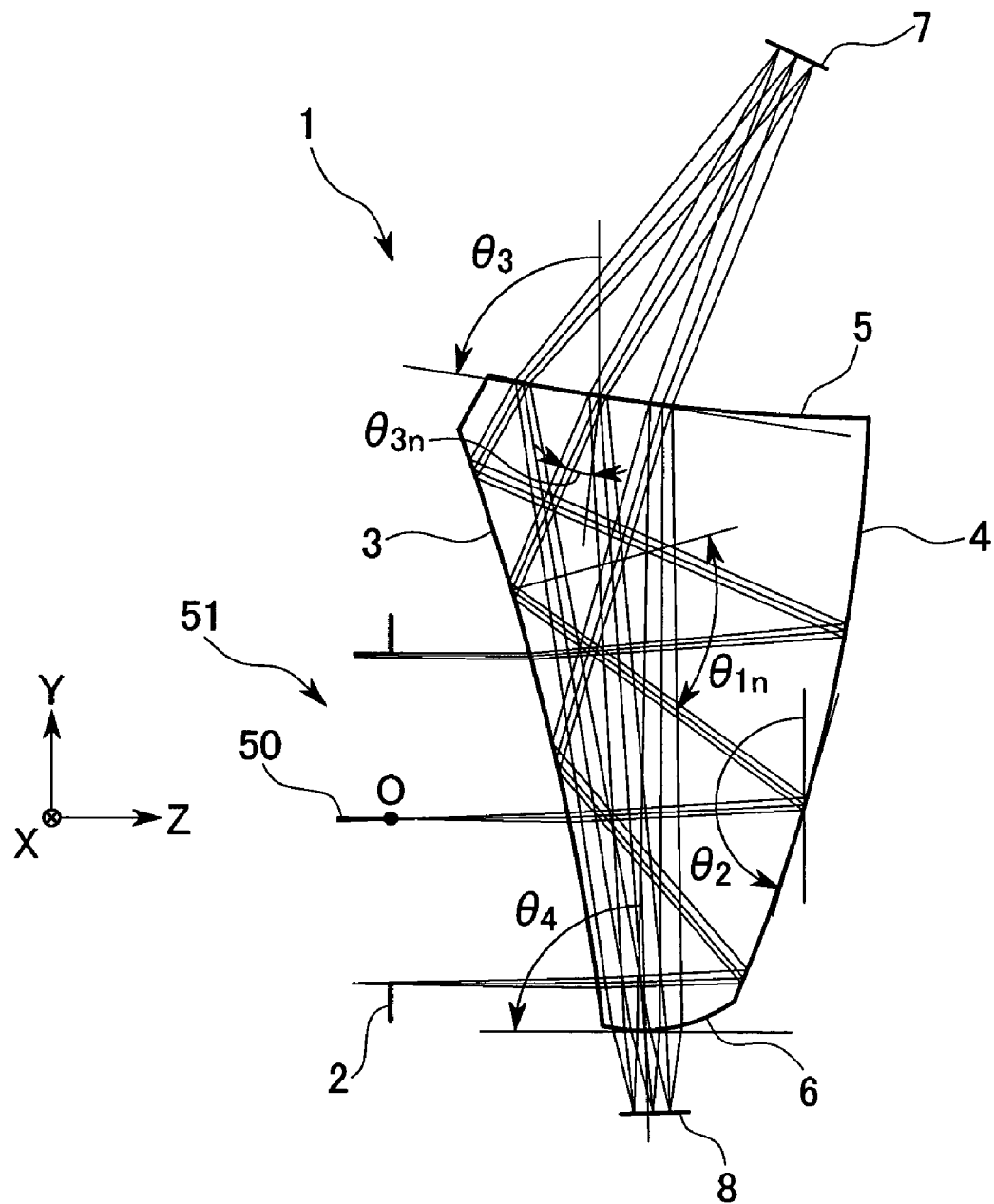
FIG. 1 is a figure for explaining one example of a decentering optical system according to a first embodiment of the present invention, and is an optical path diagram including, in cross section, an axial principal ray.

FIG. 1 is a figure for explaining one example of a decentering optical system according to the present embodiment, and is an optical path diagram including, in cross section, an axial principal ray. FIGS. 2A and 2B are optical path diagrams in which a reflection optical path and a transmission optical path shown in FIG. 1 are shown separately from one another.

The coordinate axes shown in the figures indicate XYZ-coordinate systems which are used in the calculations for preferred numerical value embodiments which will be described later, and the direction of progression of a luminous flux agrees with the Z-axis direction, while the depth direction away from the viewer behind the surface of the drawing paper agrees with the X-axis direction. In addition, light beams of which the angles of incidence in the vertical direction are 0° and ±0.1° are each shown as a main light beam and two subsidiary light beams (in the following optical path diagrams, the same indications are used unless exceptions are explained in particular).

The decentering optical system according to the present embodiment will be explained.

As shown in FIG. 1, a prism 1 (the decentering optical system) of the present embodiment constitutes an imaging optical system which: receives an incident luminous flux 51 (input light) which is a substantially parallel beam from the leftward direction as seen in the figure; splits the optical path thereof into two directions; and creates a real image upon each direction external to the prism. Furthermore, if a paraxial focal length is termed F, and if the entrance pupil diameter is termed D, then the above-mentioned Equation (1) is satisfied.

As for the material of the prism 1, it is made from a medium whose refractive index is greater than 1. As this kind of medium, for example, glass or synthetic resin may be used.

At the boundary surface between the medium of the prism 1 and the air, at least the following four optical surfaces are formed: an incident surface 3, a reflective surface 4 (an internal reflective surface), a splitting surface 5, and a transmission surface 6. Each of these optical surfaces is endowed with an appropriate curvature for its task, and has a cross sectional shape in accordance with the curvature at each position in the direction vertical to the drawing paper; and, they are formed as solid bodies having substantially pillar shapes, and having substantially the same cross sectional shape.

In the following, in order to simplify the explanation, the discussion will mainly be concerned with a two-dimensional optical path in which the incident luminous flux 51 has an angle in the Y-axis direction. Any statement made herein regarding a two-dimensional optical path can easily be extended to a three-dimensional optical path which has an angle in the X-axis direction.

The four optical surfaces are arranged in the following order, in the anticlockwise externally circumferential direction as seen in the figure: the incident surface 3, the transmission surface 6, the reflective surface 4, and the splitting surface 5. Between the splitting surface 5 and the incident surface 3, a boundary surface is formed which will not be used as an optical surface.

After the incident luminous flux 51 has passed along one optical path which is formed within this prism 1 and has arrived at the incident surface 3, the reflective surface 4, the splitting surface 5, and the transmission surface 6 in that order, a convergent beam is emitted to the exterior of the prism 1.

Moreover, in the following, the incident surface 3, the reflective surface 4, the splitting surface 5, and the transmission surface 6 will also be termed the "first surface", the "second surface", the "third surface", and the "fourth surface", according to their order of arriving along this optical path.

Among these four optical surfaces, freely curved surfaces are employed, which are curved surfaces which are rotationally asymmetric. The freely curved surface Equations which are used for expressing these types of freely curved surfaces will be explained together with the structural parameters in the preferred numerical value embodiments which will be described later.

As shown in FIG. 1, an axial principal ray 50 is defined as a light which is, from the body side, orthogonal to the center of an aperture iris 2 which constitutes an entrance pupil, and enters inside the prism 1. The axial principal ray 50 is light which passes through the center of the aperture iris 2 at an angle of incidence of 0°, and whose direction is changed as it arrives at each of the optical surfaces, so that it constitutes a reference axis for the optical system.

In the coordinate system, during the light tracking, the center of the aperture iris 2 is taken as being the origin O of the decentering optical surface of the decentering optical system (however, in order to avoid overlapping with the optical path, the coordinate axes as seen in the figure are displaced from this origin position); the direction along the axial principal ray 50 is taken as being the Z axis direction; the direction from the side of the body towards the surface (the incident surface 3) which faces the aperture iris 2 of the decentering optical system is taken as being the positive direction of the Z axis; the plane of the drawing paper is taken as being the Y-Z plane; the direction perpendicular to the surface of the drawing paper and away from the viewer is taken as being the positive direction of the X axis; and an axis is taken as the Y axis, for which the X axis, this Y axis, and the Z axis together constitute a right handed orthogonal coordinate system.

Hereinafter, each of the optical surfaces will be explained.

The incident surface 3 (the first surface) is an optical surface which is disposed so as to be eccentric or be inclined at an angle around the X axis with respect to the axial principal ray 50. This incident surface 3 (the first surface) guides the incident luminous flux 51 to the second surface by refracting it, and also reflects the light which was reflected from the second surface, towards the third surface by reflecting it internally.

In this internal reflection, in order to improve the transparency ratio at the incidence, the incident angle of the reflection light from the second surface is equal to or greater than a critical angle, and is thereby totally reflected.

In the present embodiment, when a refractive index of the medium of the prism 1 at an operation wavelength is termed as N, and an incident angle at every angle of view at the first surface of the axial principal ray which was reflected from the second surface is termed as $\theta_{1al}$, the following Equation (2) will be satisfied:

$$0.9 \sin^{-1}(1/N) \leq \theta_{1al} \leq 1.5 \sin^{-1}(1/N) \quad (2)$$

This Equation (2) specifies the range in which the light having the incident angle of $\theta_{1al}$ is substantially and totally reflected by the first surface. When the incident angle of $\theta_{1al}$ satisfies this range, since the light which was reflected by the second surface and enters the first surface, which is an internal reflective surface, can be totally reflected at every angle of view, the first surface can be the internal reflective surface without processing a reflection coating or a half mirror coating thereon.

If the incident angle of $\theta_{1al}$ exceeds and becomes greater than the upper limit, the incident angle will be too large, thereby producing a large coma aberration which cannot be compensated by the prism 1. On the other hand, if the incident angle of $\theta_{1al}$ exceeds and becomes lower than the lower limit, the incident angle at the first surface will be too much smaller than the critical angle and a processing of a reflection coating will be necessitated, thereby lowering the transparency ratio of the first surface which is the transmission surface.

Moreover, in order to have a total reflection at every angle of view, it is more preferable to employ $\sin_{-1}(1/N)$ for the lower limit. For example, it is more preferable to satisfy the following Equation (2a).

$$\sin^{-1}(1/N) \leq \theta_{1al} \leq 1.5 \sin^{-1}(1/N) \quad (2a)$$

In addition, in order to maintain the amount of the decentering aberration of the first surface within a preferable range, when an incident angle of the axial principal ray 50 at the position on the first surface, where the axial principal ray 50 of the light reflected from the second surface crosses the first surface, is termed as $\theta_{1n}$, the following Equation (3) will be satisfied.

$$40° \leq |\theta_{1n}| \leq 60° \quad (3)$$

This Equation (3) specifies the range of the incident angle $\theta_{1n}$ where the amount of the decentering aberration produced at the first surface, which is an internal reflective surface, becomes satisfactory.

When the incident angle $\theta_{1n}$ exceeds and becomes greater than the upper limit, in particular, the coma aberration on the axis becomes too large. On the other hand, when it exceeds and becomes smaller than the lower limit, since the light reflected from the first surface will return to the second surface sides, if the third surface is arranged so as to receive the light, there is a possibility that the third surface interferes with the second surface and therefore cannot be arranged.

In addition, it is preferable that the incident surface 3 is endowed with a negative power such that the light reflected from the second surface is subjected to satisfactory aberration compensation.

Furthermore, in order to reduce decentering aberration, it is preferable to adopt, for example, an aspheric surface or a freely curved surface. As for the freely curved surface, it is possible to adopt, for example, a rotationally asymmetric curved surface which is asymmetric in the direction of inclination, while being symmetric with respect to the Y-Z plane.

The reflective surface 4 (the second surface) is an optical surface for folding up the optical path by internally reflecting the incident luminous flux 51 towards the first surface while condensing the incident luminous flux 51 which has passed through the first surface. Furthermore, it is arranged so as to be decentering with respect to the axial principal ray 50 which has been bent by the first surface. Furthermore, it is made as a surface which is endowed with a principal positive power in this decentering optical system.

The reflective surface 4 can be manufactured by applying an appropriate reflective coating layer to the boundary surface of the medium, which has been processed into a predetermined curved surface.

The reflective surface 4 can be endowed with a large positive power, even though it is of comparatively low curvature, since it is made as an internal reflective surface which reflects the light internally to the medium, whose refractive index is greater than 1. However, since decentering aberration take places due to its decentering arrangement, it is desirable for the reflective surface 4 to be made as a freely curved surface in order to compensate the decentering aberration. As for the freely curved surface, it is possible to employ a rotationally asymmetric curved surface which is asymmetric in the direction of inclination with respect to the Y-Z plane, while being rotationally asymmetric with respect to the X-Z plane.

When this kind of rotationally asymmetric curved surface is employed, a configuration having simultaneously positive power and negative power depending on the asymmetric position may be employed. With this configuration, it is possible to compensate the decentering aberration in a satisfactory manner, which takes place depending on the asymmetric position.

The splitting surface 5 (the third surface) is an optical surface which splits the light which has been reflected internally from the second surface and the first surface into reflected light which is reflected internally towards the transmission surface 6, and transmitted light which is transmitted to the exterior of the prism 1 and forms an image at an image surface 7. This splitting surface 5 (the third surface) is arranged so as to be decentering or inclined with respect to the axial principal ray 50 of the light which was internally reflected from the first surface.

In the following, the optical paths of the reflected light reflected from the splitting surface 5 and transmitted light will be termed, respectively, the reflection optical path and the transmission optical path.

As for the surface shape of the splitting surface 5, it is possible to employ any surface shapes, as log as only the transmitted light in the transmission optical path forms a real image by forming an image at the image surface 7 in any appropriate position exterior of the prism 1, while the reflected light which is internally reflected through the reflection optical path forms a real image by forming an image at the image surface 8 in any appropriate position exterior of the prism 1, by the combination with the transmission surface 6. For example, according to requirements, it is possible to employ a surface which includes a convex surface or a concave surface towards the exterior side of the prism 1, or a planar surface or a rotationally asymmetric surface, or the like.

If the rotationally asymmetric surface is employed, it is possible to employ, for example, a configuration in which it is simultaneously endowed with a positive power and a negative power depending on an asymmetric position.

If a planar surface is employed as the surface shape for the splitting surface 5, it is possible to make the imaging performances for reflected light and the transmitted light to be substantially equivalent to one another. Furthermore, when a planar surface is employed, if the splitting surface 5 is processed by a cutting process, the cutting process itself will be a planar processing, while, if the splitting surface 5 is processed by a molding process, the molding process itself will be a planar processing. Accordingly, the manufacturing process becomes simple, so that a reduction in cost can be anticipated.

The splitting surface 5 can be made by performing surface processing upon the boundary surface of the medium, such as reflection coating, half mirror coating, or the like, for controlling the reflection ratio with respect to light which is internally incident.

Furthermore, in cases such as, for example, when it is not necessary for the reflection ratio to be made very high, or the like, it would also be acceptable to omit the surface processing such as reflection coating, half mirror coating, or the like, so that the optical path is split by the reflection which takes place due to the difference between the refractive index of the medium and the refractive index of the air. In this case, there is the beneficial aspect that it is possible to manufacture at a cheaper price, since it is not necessary to perform the surface processing, which is laborious.

In the present embodiment, when the refractive index of the medium of the prism 1 at an operation wavelength is termed as N, while an incident angle at every angle of view at the third surface of the axial principal ray which was reflected from the first surface is termed as $\theta_{3al}$, the following Equation (4) will be satisfied:

$$0.1 \sin^{-1}(1/N) \leq \theta_{3al} \leq 0.95 \sin^{-1}(1/N) \quad (4)$$

This Equation (4) specifies the range of the incident angle where the light having the incident angle of $\theta_{3al}$ satisfactorily splits at the third surface.

When the incident angle $\theta_{3al}$ exceeds and becomes greater than the upper limit, the incident angle will be too large, and as a result, the proportion of the light reflected becomes too large, or it is totally reflected if it exceeds the critical angle. In addition, if it exceeds and becomes smaller than the lower limit, the light reflected from the third surface will return to the first surface side. Therefore, if the fourth surface is arranged so as to receive the light, there is a possibility that it interferes with the first surface and cannot be arranged.

In addition, in order to maintain the amount of the decentering aberration of the third surface within a preferable range, when an incident angle of the axial principal ray 50 at the position on the third surface, where the axial principal ray 50 of the light reflected from the first surface crosses the third surface, is termed as $\theta_{3n}$, the following Equation (5) will be satisfied.

$$5° \leq \theta_{3n} \leq 35° \quad (5)$$

This Equation (5) specifies the range of the incident angle $\theta_{3n}$ where the amount of the decentering aberration produced at the third surface, which is an internal reflective surface, becomes satisfactory.

When the incident angle $\theta_{3n}$ exceeds and becomes greater than the upper limit, the decentering aberration (in particular, the inclination amount of the image surface) will be greater, since the difference between the reflection positions due to the difference of the image heights becomes greater. On the other hand, when it exceeds and becomes smaller than the lower limit, since the light reflected from the third surface will return to the first surface sides, if the fourth surface is arranged so as to receive the light, there is a possibility that the fourth surface interferes with the first surface and therefore cannot be arranged.

The transmission surface 6 (the fourth surface) is an optical surface which transmits the light which has been reflected from the splitting surface 6, emits it exterior to the prism 1, and forms an image at an image surface 8. The transmission surface 6 (the fourth surface) is arranged so as to be substantially parallel to the splitting surface 6, or decentering or inclined with respect to the transmission surface 6 (the fourth surface) with a slight inclination angle.

In the present embodiment, as shown in FIG. 1, the splitting surface 5 and the transmission surface 6 are formed at a position which is, in the cross sectional view, sandwiched between the incident surface 3 and the reflective surface 4. Therefore, the optical path proceeding from the splitting surface 5 to the transmission surface 6 is arranged so as to cross each of the optical path proceeding from the incident surface 3 to the reflective surface 4 and the optical path proceeding from the reflective surface 4 to the incident surface 3; thereby the optical path is folded up in a compact manner.

That is, the axial principal ray 50 crosses, in the reflection optical path, at least two axial principal rays 50 before reaching the splitting surface 5. Namely, it shows an example in which the axial principal ray 50 crosses at least once within the prism 1.

Any surface shapes can be employed for the transmission surface 6 as long as only a real image is formed at the image surface 8; for example, it is desirable to employ a rotationally asymmetric surface in order to compensate the decentering aberration.

Next, an explanation will be made of the relative inclinations of each optical surface.

A plane which is orthogonal to the axial principal ray 50 passing though the center of the aperture iris 2 is made as a reference surface in order to indicate the amount of eccentricity or inclination of each optical surface.

In addition, as shown in FIG. 1, in order to indicate the inclination of the second surface, the inclination of a contact plane at the point of intersection between the axial principal ray 50 which passes through the first surface and enters the second surface, and the second surface, is denoted as an inclination angle $\theta_2$, when the inclination is measured with respect to the reference surface.

In addition, in order to indicate the inclination of the third surface, the inclination of a contact plane at the point of intersection between the axial principal ray 50 which was reflected from the first surface, and the third surface, is denoted as an inclination angle $\theta_3$, when the inclination is measured with respect to the reference surface.

In addition, in order to indicate the inclination of the fourth surface, the inclination of a contact plane at the point of intersection between the axial principal ray 50 which was reflected from the third surface, and the fourth surface, is denoted as an inclination angle $\theta_4$, when the inclination is measured with respect to the reference surface.

These determinations are also applicable to the other drawings, examples, and embodiments.

In this case, it is desirable that the inclination angles $\theta_1$, $\theta_2$, $\theta_3$, and $\theta_4$, satisfy at least one of following Equations (6) and (7).

$$50° \leq |\theta_3 - \theta_2| \leq 120° \quad (6)$$

$$|\theta_4 - \theta_3| \leq 40° \quad (7)$$

The above Equation (6) specifies the range of the inclination angles where the relative inclination between the second surface and the third surface becomes desirable.

When $|\theta_4 - \theta_3|$ exceeds and becomes greater than the upper limit, since the angle formed between the second surface and the third surface will be too small and the light reflected from the third surface will be reflected towards the second surface sides, it becomes difficult to arrange the third surface such that the third surface will not block the light that should be reflected from the second surface and proceed to the first surface. On the other hand, when it exceeds and becomes smaller than the lower limit, the angle formed between the second surface and the third surface will be too large, and thereby the prism 1 becomes enlarged too much.

The above Equation (7) specifies the range of the inclination angles where the relative inclination between the third surface and the fourth surface becomes desirable.

That is, according to the above Equation (7), the degree of parallelism between the third surface and the fourth surface is within a range of 0° to 40°. Therefore, the inclination of the image surface at the focal point surface can be small; and thereby it becomes possible to configure a compact and high-performance decentering optical system.

When $|\theta_4 - \theta_3|$ exceeds and becomes greater than the upper limit, the light reflected from the third surface towards the fourth surface is greatly refracted by the fourth surface, and a large off-axis aberration is generated.

Furthermore, since the inclination of the image surface at the focal point surface will be large, when arranging a light reception surface for receiving imaging light upon, for example, the image surface 8, it should be separated from the prism 1, thereby making the apparatus employing the prism 1 large.

Moreover, in order to obtain the decentering optical system having higher performance, it is desirable to make the range of $|\theta_4 - \theta_3|$ smaller than a range of the above Equation (7). For example, it is more desirable to satisfy the following Equation (7a).

$$|\theta_4 - \theta_3| \leq 30° \quad (7a)$$

The operation of the prism 1 of the present embodiment will be explained by following along the optical path of the decentering optical system.

The luminous flux diameter of the incident luminous flux 51 is constrained to the size of the entrance pupil diameter D by the aperture iris 2, and is incident upon the transmission surface 3.

Since the transmission surface 3 is disposed eccentrically or slantingly around the X axis with respect to the axial principal ray 50, the incident luminous flux 51 is curved and proceeds towards the outside of the incident optical axis.

And the luminous flux 51 proceeds along within the medium and arrives at the reflective surface 4, and is internally reflected. Since the reflective surface 4 is endowed with a positive power, and is decentering around the X axis, along with the luminous flux being condensed, it proceeds towards the incident surface 3. Here, by making the reflective surface 4 as a rotationally asymmetric surface, it becomes possible to reduce the occurrence of the decentering aberration.

The light which is internally reflected from the reflective surface 4 is internally reflected by the incident surface 3 towards the splitting surface 5. As has been explained above, the incident light is folded up into a Z-shape within the prism 1, and proceeds towards the splitting surface 5.

At this time, in the present embodiment, since the incident angle $\theta_{1al}$ of the principal ray at every angle of view, which is reflected by the reflective surface 4, satisfies the Equation (2), all of the lights are totally reflected or are reflected in a condition close to substantially total reflection, even if the angle of incidence varies. Therefore, since the incident surface 3 can be a satisfactory internal reflective surface without forming a reflection coating or a half mirror coating thereon, it is possible to prevent the occurrence of light loss of the incident light which is incident into the incident surface 3, due to the influence of the reflection coating and the like.

Furthermore, since the incident angle $\theta_{1al}$ satisfies the above Equation (2), the occurrence of a coma aberration can be suppressed.

In addition, since the incident angle $\theta_{1n}$ satisfies the above Equation (3), the coma aberration upon the optical axis can be suppressed.

Since the incident surface 3 is endowed with a negative power as an internal reflective surface, it is possible to reduce the decentering aberration, caused by the reflective surface 4. In particular, if it is made as a rotationally asymmetric curved surface which is asymmetric in the direction of inclination, while being symmetric with respect to the Y-Z plane, then it becomes possible to perform satisfactory aberration compensation by changing power in the direction of inclination, according to requirements.

The luminous flux which has been internally reflected from the incident surface 3 is incident into the splitting surface 5, while experiencing an optical effect according to the curvature of the incident surface 3; and the optical path thereof is split into transmission light and reflection light.

In a reflection optical path, as has been shown in FIG. 2A, the light which is internally reflected from the splitting surface 5 proceeds to the transmission surface 6 which is disposed at a position which is sandwiched between the incident surface 3 and the reflective surface 4 in the externally circumferential direction of the prism, while experiencing an optical effect according to the curvature of the splitting surface 5, which is an internal reflective surface. The light, at this time, will proceed while crossing over each axial principal ray of the light proceeding from the incident surface 3 to the reflective surface 4, and the axial principal ray of the light proceeding from the reflective surface 4 to the incident surface 3.

And due to the positive power of the transmission surface 6, it is made into convergence light, and then is emitted to the exterior of the prism 1. Then it forms a real image at the image surface 8.

On the other hand, in the transmission optical path, as has been shown in FIG. 2B, the light passing through the splitting surface 5, while experiencing an optical effect according to the curvature of the splitting surface 5, forms convergence light and is emitted to the exterior of the prism 1. Then it forms a real image at the image surface 7.

By disposing at the image surfaces 7 and 8 an imaging element such as a light reception element such as a PD (Photo Diode) or the like, a position detecting sensor such as a PSD (Position-Sensitive Detector) or the like, or an imaging element such as a CCD (Charge-Coupled Device) or a CMOS (Complementary Metal Oxide Semiconductor) or the like, and so on, it becomes possible to obtain information concerning the incident luminous flux 51, thereby enabling the forming a part of a variety of devices and optical systems.

According to the prism 1 of the present embodiment, since the reflection optical path for imaging at the image surface 8 is reflected and folded up three times in a compact manner by the three optical surfaces within the medium having a refractive index greater than 1, it is possible to obtain a compact decentering optical system, even if the length of this optical path is long.

In addition, by performing reflections three times at the internal reflective surfaces within the medium having a refractive index greater than 1 and having comparatively larger power compared to the size of curvatures of the optical surfaces, it becomes possible to compensate the aberration by each internal reflective surface, thereby enabling an improvement in optical performance.

Furthermore, since the above Equation (1) is satisfied, the ratio of the paraxial focal length F to the entrance pupil diameter D will be kept within a preferable range, thereby enabling a comparatively compact decentering optical system while securing the spherical aberration and the coma aberration within preferable ranges.

Yet further, by satisfying the above Equations (1) through (7), it is possible to configure a decentering optical system which is unified with the prism having a balanced shape, while maintaining a satisfactory imaging performance for each.

Accordingly, by utilizing the above in an optical system such as a telescope or free-space optical communication or the like, which needs a comparatively long optical path length and comparatively high imaging performance such as resolution, brightness, and the like, it is possible to anticipate an increase in compactness and lightness, and a reduction in cost.

Furthermore, since at least two among the four optical surfaces are made as rotationally asymmetric surfaces, it is possible to compensate decentering aberration of the trapezoidal deformation of the image and inclination of the image surface and the like, by combining these as asymmetric curved surfaces upon the side of the subsidiary light beams with respect to the axial principal ray 50. As a result, it is possible to obtain a decentering optical system with low decentering aberration and high performance.

At this time, it would also be acceptable to make all of the four surfaces as rotationally asymmetric surfaces. If the number of rotationally asymmetric surfaces is thus increased, high accuracy aberration compensation becomes correspondingly possible. Furthermore, as a result of apportioning the compensation amount among optical surfaces, there is an advantage in that each shape of the curved surfaces becomes easy to manufacture.

Moreover, if the required compensation of the decentering aberration is possible, a rotationally asymmetric shape or a planar shape which is easy to be manufactured, may be employed, by employing the number of the rotationally asymmetric surfaces of one surface or zero surfaces. In this case, it is possible to reduce the manufacturing cost.

Next, a first variant example of the present embodiment will be explained.

Figure 3A:
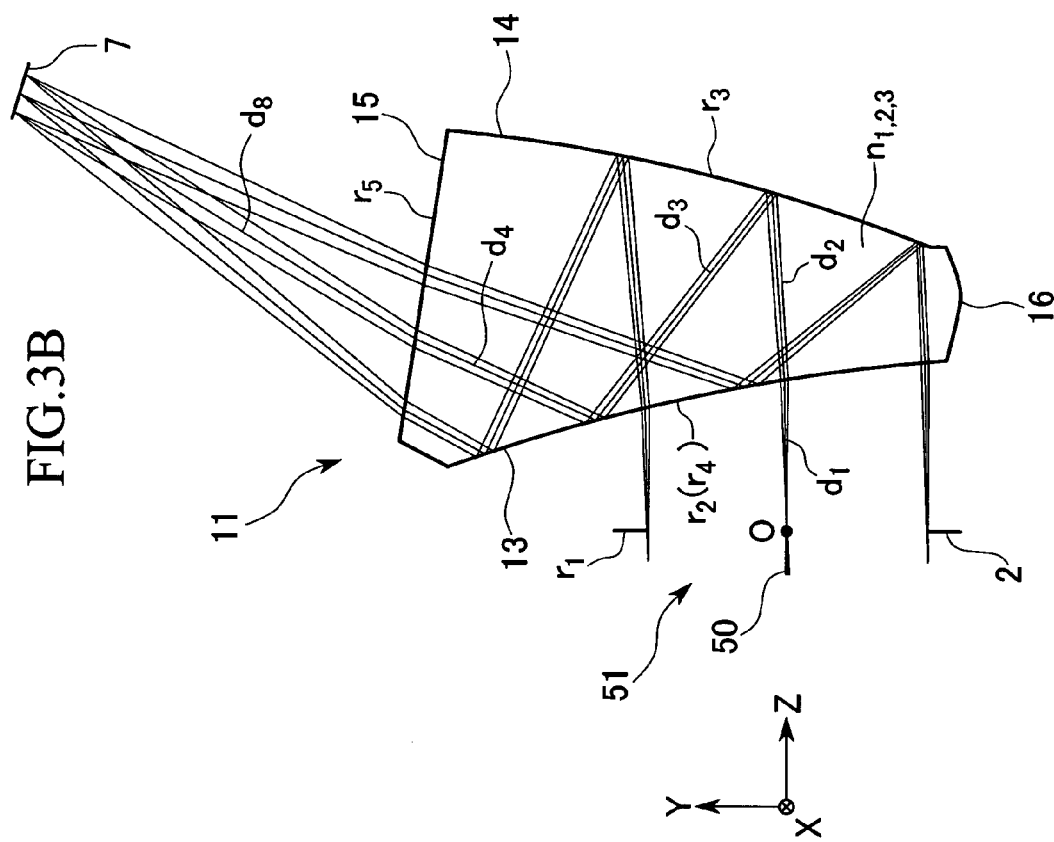
FIGS. 3A and 3B are figures for explaining a first variant example of the decentering optical system according to the same embodiment, and are optical path diagrams including, in cross section, an axial principal ray, in which the reflection optical path and the transmission optical path are shown separately from one another.
Figure 3B:
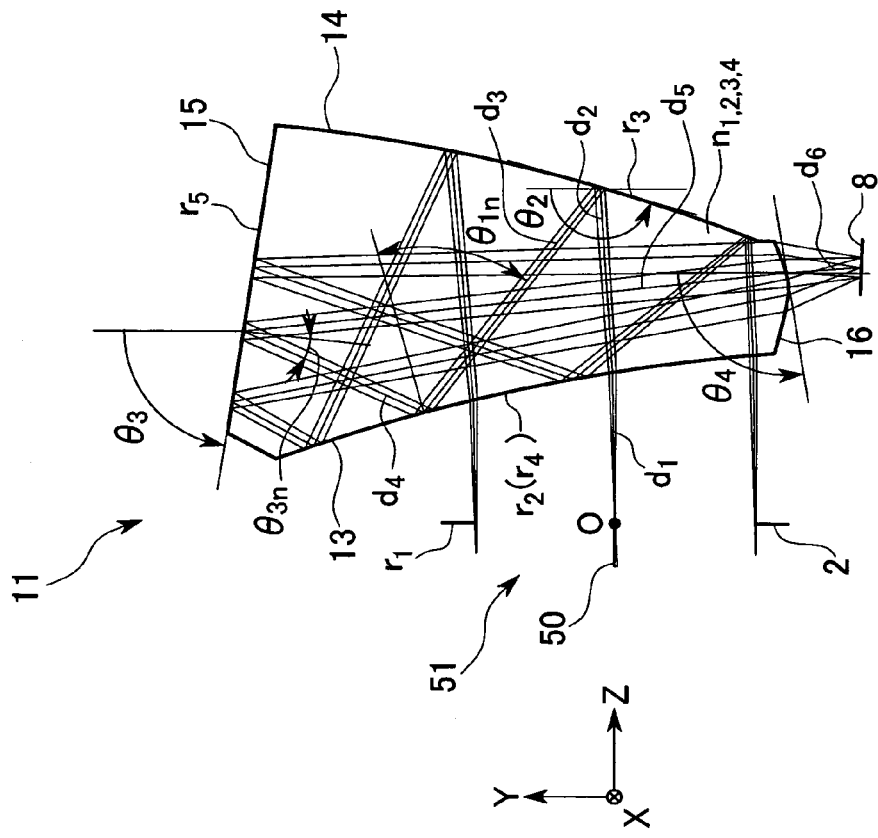

FIGS. 3A and 3B are figures for explaining the first variant example of the decentering optical system according to the present embodiment, and are optical path diagrams including, in cross section, an axial principal ray, in which the reflection optical path and the transmission optical path are shown separately from one another.

As shown in FIGS. 3A and 3B, the decentering optical system of the present variant example consists of a prism 11 (the decentering optical system) instead of the prism 1 of the present embodiment.

The prism 11 includes an incident surface 13 (the first surface), a reflective surface 14 (the second surface), a splitting surface 15 (the third surface), and a transmitting surface 16 (the fourth surface), instead of the incident surface 3, the reflective surface 4, the splitting surface 5, and the transmitting surface 6, of the prism 1 of the present embodiment.

The prism 11 differs from the prism 1 in the point that a planar surface is used for the surface shape of the splitting surface 15. In addition, as for the other optical surfaces, configurations such as the surface shape, the amount of deflection, and power, of each are changed so as to be able to obtain satisfactory imaging at the image surfaces 7 and 8 by employing the planar shape for the splitting surface 15. The above-mentioned Equations (1) through (7) and so on are also applicable to this prism 11 in the same manner.

According to this configuration, since one among the four optical surfaces employs a planar shape, a process of the optical surface becomes easy, thereby enabling manufacturing cost reduction.

In addition, by employing the planar shape for the splitting surface 15, which is an emitting surface on the transmission optical path side, parts arrangement and positioning on the transmission optical path side become easy. Accordingly, it becomes easy to perform assembly and arrangement when it is installed into other devices, or it is used together with other optical elements.

Next, a second variant example of the present embodiment will be explained.

Figure 4B:
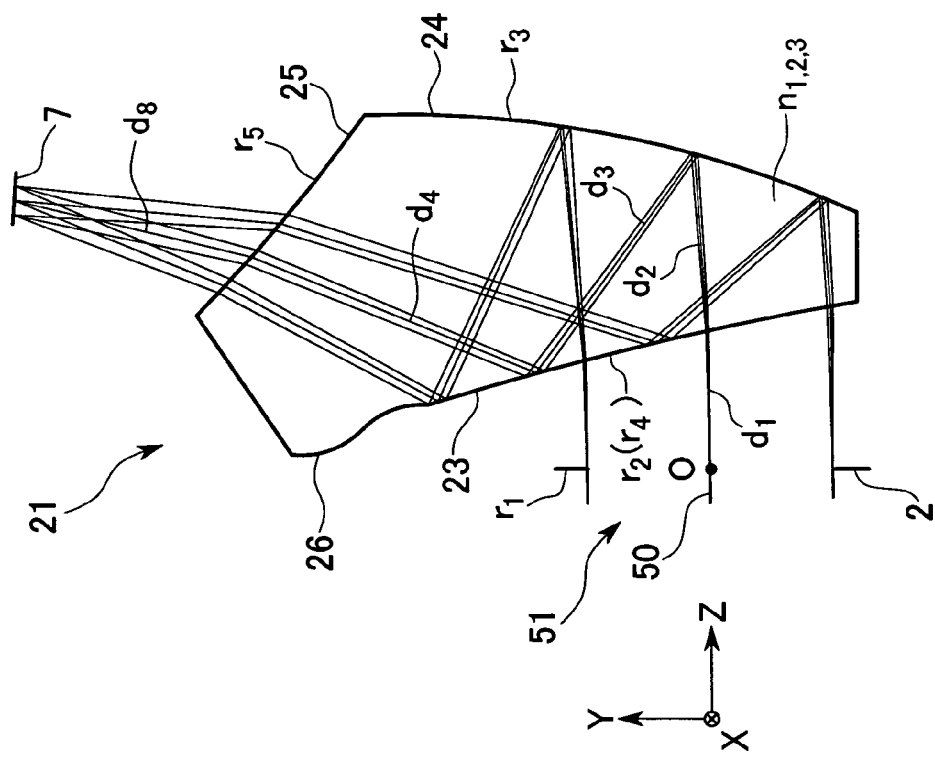
FIGS. 4A and 4B are figures for explaining a second variant example of the decentering optical system according to the same embodiment, and are optical path diagrams including, in cross section, an axial principal ray, in which the reflection optical path and the transmission optical path are shown separately from one another.
Figure 4A:
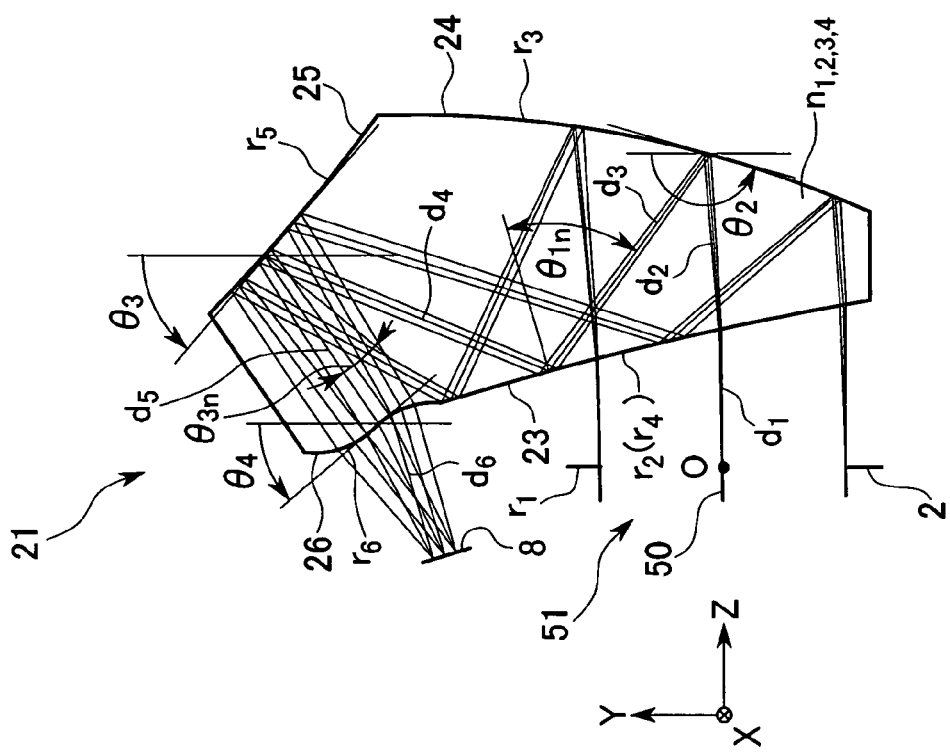

FIGS. 4A and 4B are figures for explaining the second variant example of the decentering optical system according to the present embodiment, and are optical path diagrams including, in cross section, an axial principal ray, in which the reflection optical path and the transmission optical path are shown separately from one another.

The decentering optical system of the present variant example is equipped with a prism 21 (the decentering optical system) instead of the prism 1 of the present embodiment.

The prism 21 includes an incident surface 23 (the first surface), a reflective surface 24 (the second surface), a splitting surface 25 (the third surface), and a transmitting surface 26 (the fourth surface), instead of the incident surface 3, the reflective surface 4, the splitting surface 5, and the transmitting surface 6, of the prism 1 of the present embodiment.

The prism 21 differs from the prism 1 in the point that the transmitting surface 26, which is the fourth surface, is disposed at a position which is sandwiched between the first surface and the third surface in the externally circumferential direction of the prism. That is, a boundary surface 47 sandwiched between the first surface and the second surface is not used as an optical surface, and is provided with a planar surface which is formed as a chamfered shape, a mounting section type shape, or the like.

In addition, as for the other optical surfaces, corresponding to them, configurations such as the surface shape, the amount of deflection, and power, of each are changed so as to be able to obtain satisfactory imaging at the image surfaces 7 and 8. The above-mentioned Equations (1) through (7) and so on are also applicable to this prism 21 in the same manner.

According to this configuration, since the axial principal ray proceeding from the third surface to the fourth surface will not cross over the axial principal ray of the other light, it is possible to arrange comparatively freely the direction to be emitted towards the exterior of the prism 21 in the reflection optical path. In particular, it becomes easy to emit in the direction parallel to the incident luminous flux 51, or in the direction crossing over the incident luminous flux 51 with a shallow angle. Accordingly, even when the optical path length is long, there is no need to secure a space for the arrangement in the direction orthogonal to the incident luminous flux 51, or in the direction crossing over the incident luminous flux 51 with an angle close to 90°. Accordingly, the arrangement thereof can be made in a compact manner, even when a space for arrangement in such direction is restricted.

Second Embodiment

Next, a decentering optical system according to a second embodiment will be explained below.

Figure 5A:
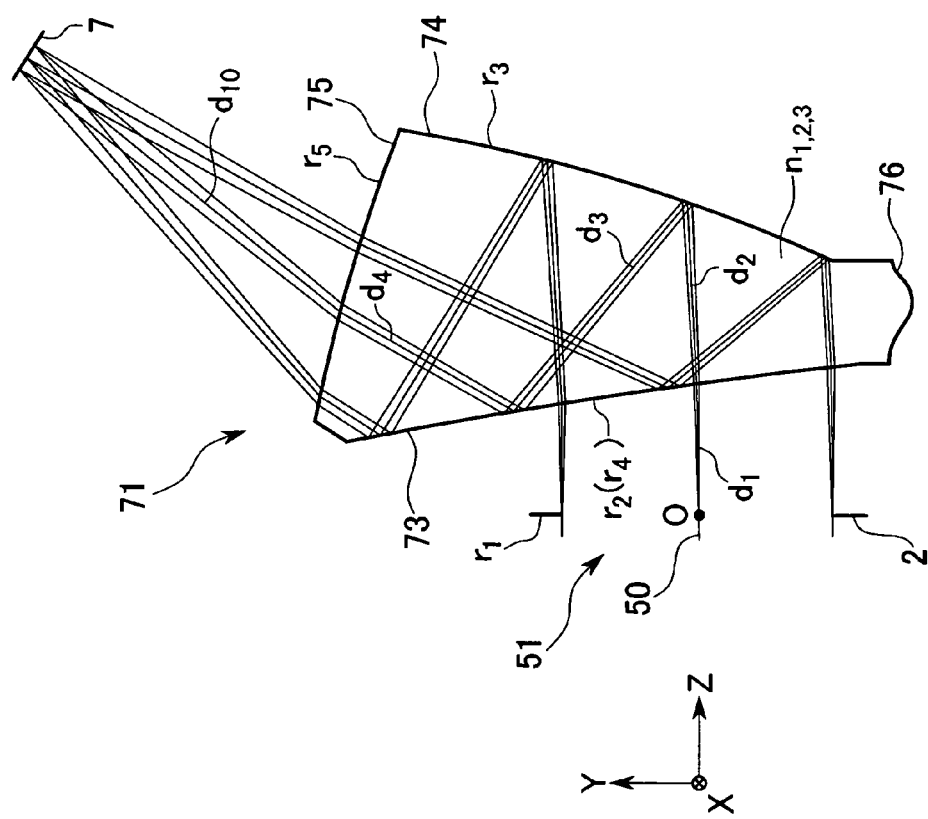
FIGS. 5A and 5B are figures for explaining a decentering optical system according to a second embodiment, and are optical path diagrams including, in cross section, an axial principal ray, in which the reflection optical path and the transmission optical path are shown separately from one another.
Figure 5B:
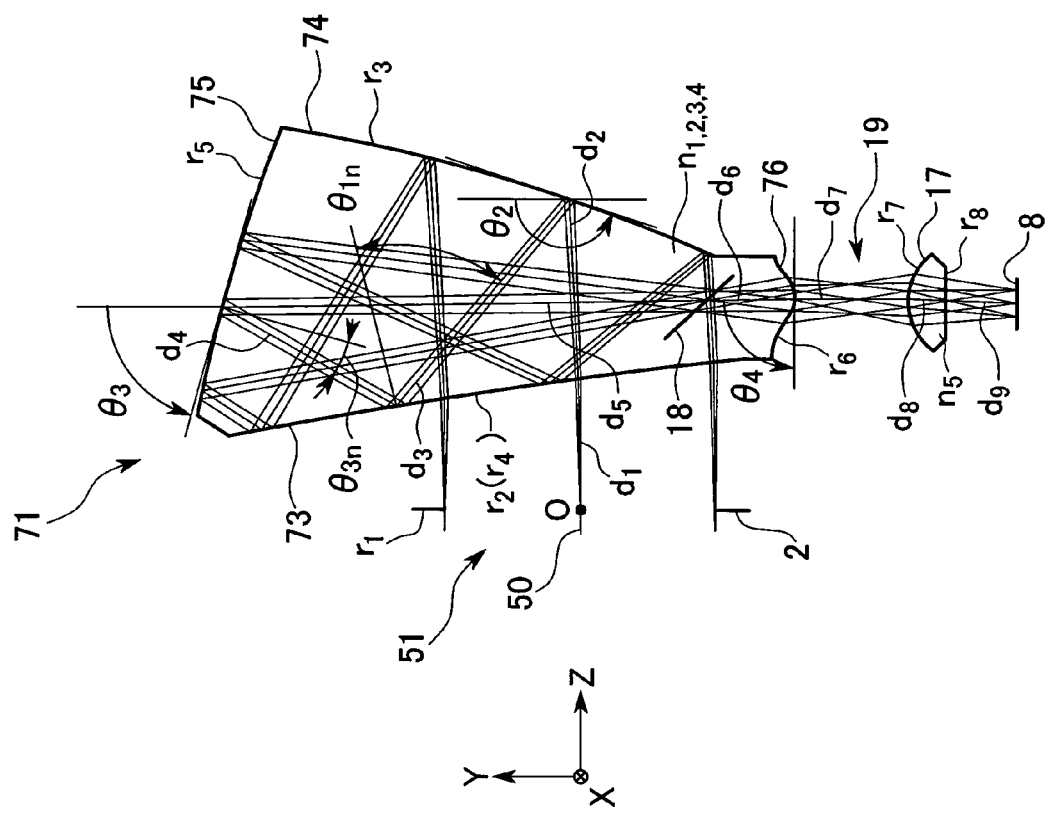

FIGS. 5A and 5B are figures for explaining one example of the decentering optical system according to the present embodiment, and are optical path diagrams including, in cross section, an axial principal ray, in which the reflection optical path and the transmission optical path are shown separately from one another.

The decentering optical system according to the present embodiment will be explained.

As shown in FIGS. 5A and 5B, by combining a prism 71 (the decentering optical system) with a lens 17 (a light condensing element), when receiving an incidence of the incident luminous flux 51, the decentering optical system of the present embodiment forms a first real image at an image surface 7 which is an exterior of the prism 71, along with forming another real image at an image surface 8.

That is, the prism 71 includes an incident surface 73 (the first surface), a reflective surface 74 (the second surface), a splitting surface 75 (the third surface), and a transmitting surface 76 (the fourth surface), instead of the incident surface 3, the reflective surface 4, the splitting surface 5, and the transmitting surface 6, of the prism 1 of the above-mentioned first embodiment. These optical surfaces configure a splitting optical system consisting of a reflection optical path and a transmission optical path, and each of these is folded up in substantially the same manner as those of the above-mentioned prism 1. The lens 17 is disposed on the reflection optical path exterior to the prism 71.

However, due to the differences such as surface shapes, the amount of deflection, power, and the like, positions of the image surfaces 7 and 8 are different from those of the above-mentioned first embodiment. Furthermore, another real image is formed on the image surface 8 by forming a real image (the second real image) onto an image surface 18 within the prism 11, forming an exit pupil 19 exterior of the prism 71 through the transmission surface 76, and imaging the light emitted from the exit pupil 19 by the lens 17.

In the following, the points in which the present embodiment differs from the first embodiment described above will be explained in a concise manner.

As for the incident surface 73, the reflective surface 74, and the splitting surface 75, it is possible to employ the same kinds of surface shapes such as the incident surface 3, the reflective surface 4, and the splitting surface 5, as long as only the second real image can be formed upon the reflection optical path within the prism 71. Furthermore, they are made so as to be able to form the second real image onto the image surface 18 by distributing the power for each.

In addition, since the folding up of the optical path is also the same as the first embodiment, the definitions of the above-mentioned Equations (1) through (7) can be applied to this prism 71 in the same manner.

The transmission surface 76 is an optical surface endowed with a positive power, by which the scattering light after imaging onto the image surface 18 is made to substantially parallel light and is emitted to the exterior of the prism 11, and the exit pupil 19 is formed at a position close to the prism 11.

Corresponding to requirements, a predetermined range can be employed for a range of the position close to the prism 11. For example, in order to make the size of the decentering optical system compact, it is desirable to make it to a range as close to the transmitting surface 16 as possible. However, when predetermined optical elements such as a lens, a mirror, a movable mirror are disposed at the exit pupil 19, these need to be disposed at a position which is apart, so as not to interfere with the transmitting surface 76.

The lens 17 is an optical element which is endowed with a positive power, and images the substantially parallel luminous flux emitted from the transmitting surface 6, onto the image surface 8. As for a surface shape and a refractive index of the lens 17, it is possible to employ the ones which correspond to the requirements of a position of the image surface 8, a range of an image angle, and the like. For example, it is possible to employ, for example, a spherical lens, an aspheric surface lens, a Fresnel lens, a reflection mirror, a DOE (diffraction optical element), a HOE (hologram element), or the like.

According to the configuration explained above, at least the light emitted onto the reflection optical path is made to substantially parallel light, and the exit pupil 19 is formed. Accordingly, for example, by splitting a part of the substantially parallel light, or by arranging a predetermined optical element at a position of the exit pupil, it is possible to construct a multifunctional decentering optical system.

For example, by disposing a movable mirror such as a Galvano mirror at the exit pupil 19, and by disposing onto the image surface 8 a light-receiving device which performs a photoelectrical conversion and light detection, it is possible to easily construct a decentering optical system which can reliably receive the light at a constant position by controlling the inclination of the movable mirror, even if the angle of incidence of the incident luminous flux 51 is changed. Accordingly, the decentering optical system will be suitable for the use in, for example, a free space optical communication device or the like which is equipped with a tracking function.

Next, a variant example of the decentering optical system of the present embodiment will be explained.

Figure 6A:
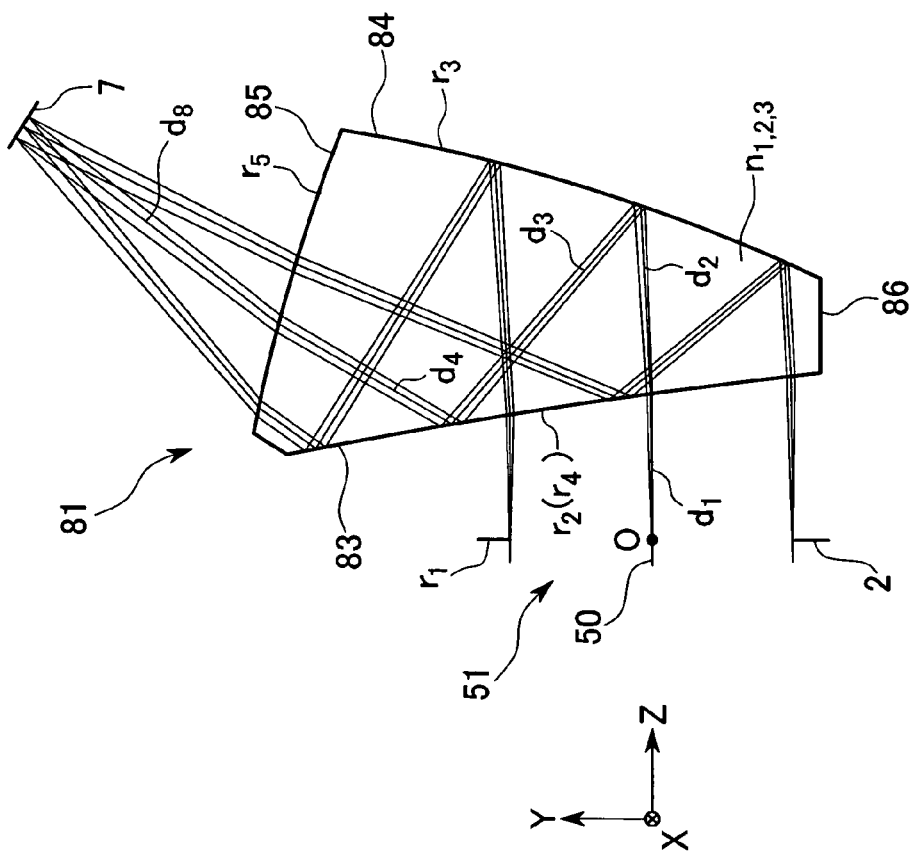
FIGS. 6A and 6B are figures for explaining a variant example of the decentering optical system according to the same embodiment, and are optical path diagrams including, in cross section, an axial principal ray, in which the reflection optical path and the transmission optical path are shown separately from one another.
Figure 6B:
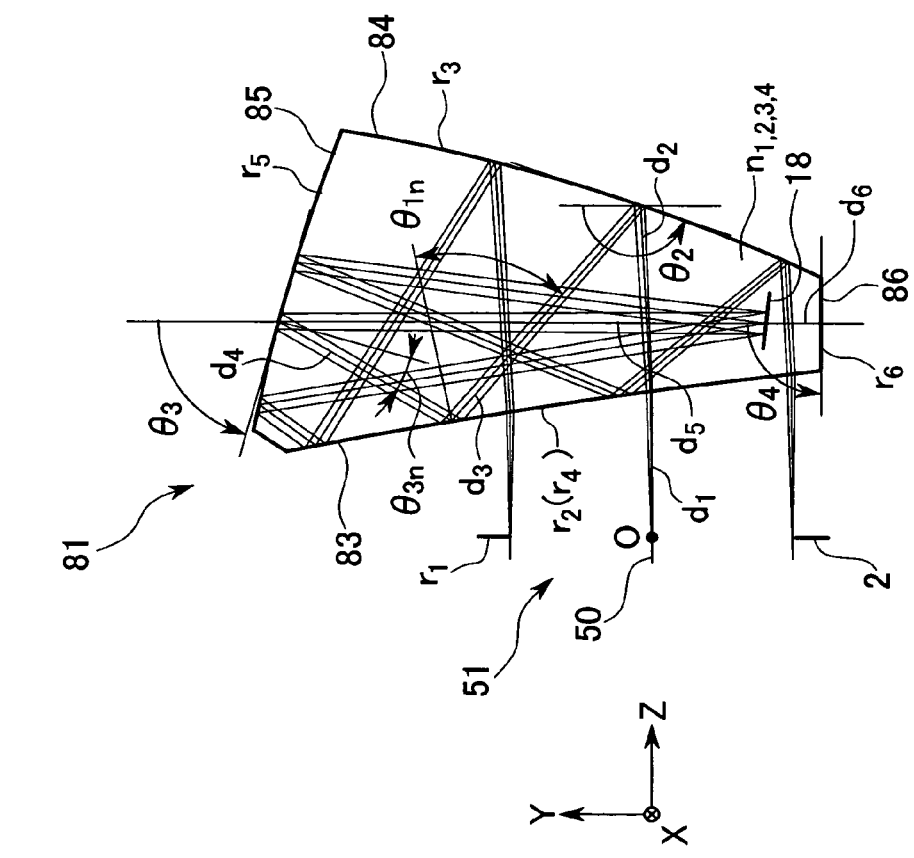

FIGS. 6A and 6B are figures for explaining a variant example of the decentering optical system according to the present embodiment, and are optical path diagrams including, in cross section, an axial principal ray, in which the reflection optical path and the transmission optical path are shown separately from one another.

As shown in FIGS. 6A and 6B, the decentering optical system of the present variant example is equipped with a prism 81 (a decentering optical system) instead of the prism 71 of the present embodiment.

That is, the prism 81 includes an incident surface 83 (the first surface), a reflective surface 84 (the second surface), a splitting surface 85 (the third surface), and a transmitting surface 86 (the fourth surface), instead of the incident surface 73, the reflective surface 74, the splitting surface 75, and the transmitting surface 76, of the prism 71 of the present embodiment.

The second real image is formed upon the image surface 18 within the prism 81 by the incident surface 83, the reflective surface 84, and the splitting surface 85, which is as an internal reflective surface.

It is different from the above-mentioned prism 71 of the present embodiment in the point that a planar surface is employed for the transmitting surface 86.

Due to this, in order to form an exit pupil upon the reflection optical path using the prism 81, another optical element needs to be used together.

For example, it is possible to glue a plano-convex lens of which one surface is a planar surface and another surface is endowed with a positive power, to the transmitting surface 86, or make it adjoin.

For example, it is possible to construct a decentering optical system having completely the same performance as the prism 71, by making the prism 71 which is provided with a planar surface instead of the transmitting surface 76 as a prism 81, and by gluing a lens element having a planar surface and a surface shape of the transmitting surface 76.

According to the configuration explained above, when, for example, a position of the exit pupil 19 needs to be changed, it is possible to easily change the position of the exit pupil 19 by changing the shape or the refractive index of a medium of another optical element which is used together with the prism 81.

Accordingly, it becomes possible to make the prism 81 applicable to a variety of uses and a low-cost parts, since it is not necessary to change the design of other optical surfaces or to remake a new prism in order to change a position of the exit pupil 19.

For example, by fabricating the prism 81 using a plastic molding and by providing another optical element as a lens element or the like corresponding to requirements, it is possible to improve the applicability and to reduce a molding cost.

Moreover, in the present variant example, if the image surface 18 is formed at the exterior of the prism 81 by changing the power of the predetermined optical surface, it will be the same as the example in the first embodiment described above, in which the fourth surface is formed by a planar surface.

Third Embodiment

An optical system according to a third embodiment of the present invention will be explained in the following.

Figure 7:
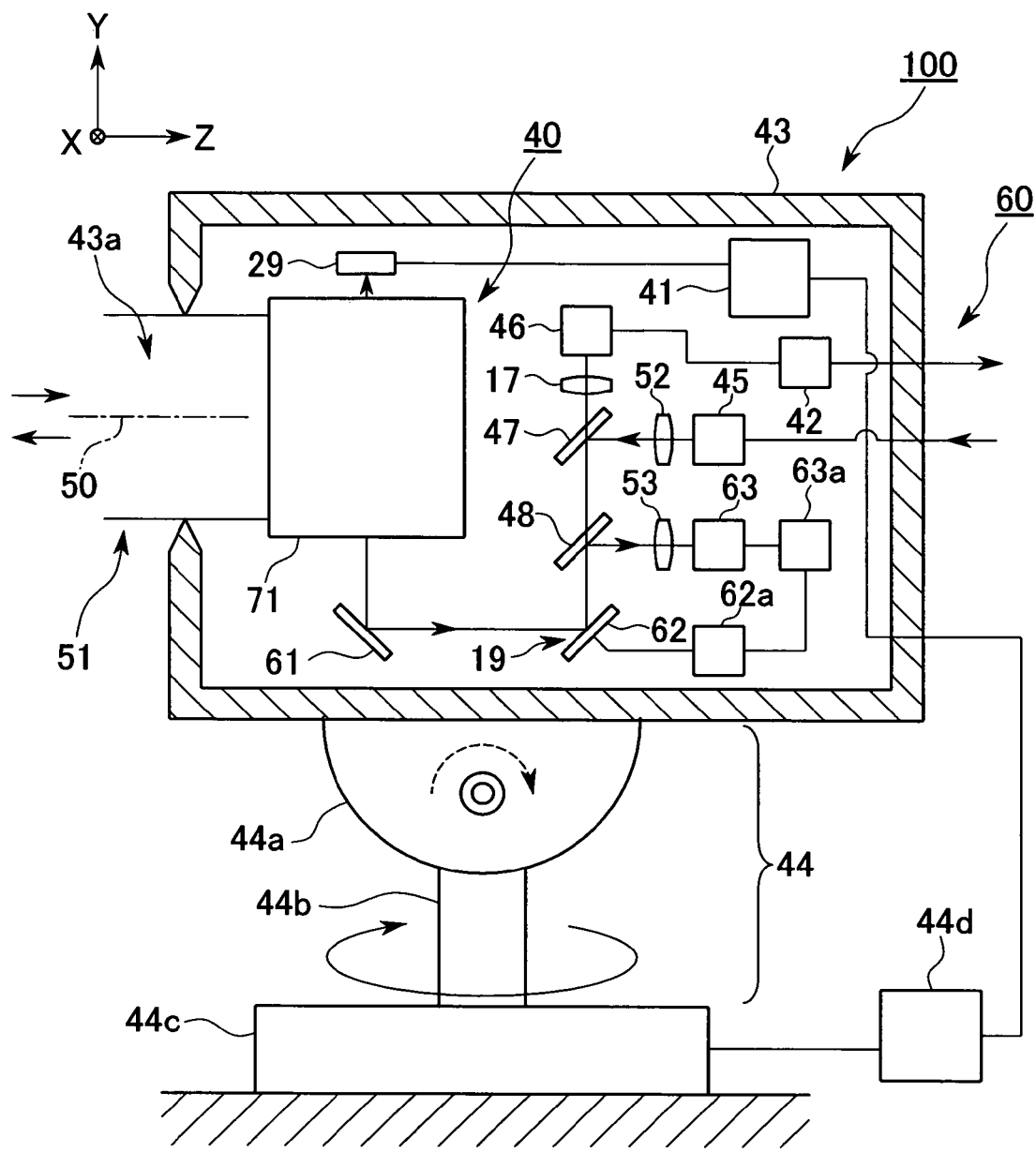
FIG. 7 is a schematic explanation figure for explaining a general structure of an optical system according to a third embodiment of the present invention.

FIG. 7 is a schematic explanatory figure for explaining a general structure of the optical system according to the third embodiment of the present invention.

An optical system 100 according to the present embodiment will be explained.

The optical system 100 can transmit substantially parallel light to an exterior while receiving and tracking the substantially parallel light from the exterior, and is generally configured with a light condensing unit 60, and a gimbal stage 44 (a shift mechanism).

The light condensing unit 60 is equipped with a chassis 43, a decentering optical system 40, a light reception element 29, a control device 41 (a position control device), a deflection control device 62a, a light reception element 46 (a light-receiving device), a light reception element 63, a light source 45, light splitting devices 47 and 48, collimator lenses 52 and 53, and an input signal control device 42.

The chassis 43 is a member which serves both as a holding member which holds together the various members which will be subsequently described, and as an external casing member, and is made in an appropriate shape, such as for example a box shape or the like. At a portion of the outer surface of the chassis 43, an aperture iris 43a is provided, which is an aperture section which constitutes an entrance pupil for an incident luminous flux 51. This aperture iris 43a is an effective iris which, in the normal state of use, initially regulates the luminous flux diameter of the incident luminous flux 51 when the incident luminous flux 51 has irradiated into the chassis 43; and is a member which implements the aperture iris 2 described above.

The aperture iris 43a may be formed as a separate member from the chassis 43, or, more precisely, it need not necessarily be provided upon the outer surface of the chassis 43. For example, provided that it is of a shape for which, in the state of normal use, there is no possibility that it will block the incident luminous flux 51, a hood or the like for preventing the incidence of flare light may be provided around the aperture iris 43a.

In addition, anything will serve for the aperture iris 43a, provided that it is optically open; for example, it will be acceptable to cover it over with a cover glass or the like which is transparent to light for condensation of the required wavelength.

The decentering optical system 40 consists of a prism 71 which is a decentering optical system according to the second embodiment described above and the lens 17. In addition, the decentering optical system 40 is fixed within the chassis 43 via an appropriate support member not shown in the figures, so that the aperture iris 43a becomes positioned in the position of the aperture iris 2. Since the decentering optical system 40 has a configuration as explained in the above-mentioned second embodiment with reference to FIGS. 5A and 5B, an explanation for each is omitted. Moreover, FIG. 7 schematically shows the prism 71 in the second embodiment.

A reflective mirror 61 reflects a substantially parallel light which is emitted to the exterior of the prism 71 through the reflection optical path of the prism 71, thereby refracting the optical path. Near the exit pupil 19, a Galvano mirror 62 which deflects the substantially parallel light corresponding to the requirements is disposed, and introduces the substantially parallel light towards the lens 17. A light reception element 46 which performs a photoelectrical conversion in order to, for example, extract an information signal from the incident luminous flux 51, is disposed at a position corresponding to the image surface 8 (refer to FIG. 5A).

The light reception element 29 receives the incident luminous flux 51 through the transmission optical path of the prism 71, thereby detecting a shift of the incident direction; and it is disposed at the image surface 7 upon the transmission optical path (refer to FIG. 5B).

The control device 41 is a device which: detects an imaging position of a luminous flux imaged on the light reception element 29, using light output from the light reception element 29 as an input signal; generates a position detecting signal (detection output) by calculating the amount of positional shift of the light condensing unit 60 by calculating a shift from a target position; and generates a control signal (detection output) for moving the light condensing unit 60 corresponding to calculation results.

The light reception element 63 is a position detecting element which: is disposed upon an optical path in which the light which is reflected from the Galvano mirror 62 and then is condensed by the collimator lens 53, is split by the light splitting device 48; and transmits a detection output to the control device 63a by receiving splitting light.

The control device 63a is a control device which generates a position detecting signal for calculating the amount of positional shift based on a detection output from the light reception element.

The deflection control device 62a is a device for controlling the deflection angle of the Galvano mirror 62 so as to compensate a shift of an imaging position upon the light reception element 46 based on the position detecting signal from the control device 63a.

The input signal control device 42 is a device which performs a predetermined signal processing to an electrical signal which was received by the light reception element 46 and subjected to a photoelectrical conversion, and transmits it to a device outside the light condensing unit 60.

In addition, the light source 45 is an LD (a semiconductor laser), and outputs an optical signal based on a signal from an output control device which is not shown in the figures. The emitted light is converted to substantially parallel light of which a divergence angle is optimized by the collimator lens 52, and then is synthesized to an optical path which follows an optical axis of the decentering optical system 40, by a light splitting device 47 disposed upon an optical path between the Galvano mirror 62 and the lens 17. In addition, the emitted light proceeds along the optical path in the reverse direction with respect to the reception light; then it is emitted to the exterior of the device through the aperture iris 43a of the decentering optical system 40; and then it is transmitted as an optical signal towards the same kind of light reception section which is apart therefrom.

Moreover, in the above, an explanation has been made of an example where both light transmission and light reception are available; however, it is possible to perform light transmission only by omitting the light reception element, and other related parts.

The gimbal stage 44 is a shift mechanism which holds the light condensing unit 60 while being able to control its attitude around two axial directions. This gimbal stage 44 includes: a tilt driving section 44a and a horizontal rotational drive section 44b which are supported upon a support plinth 44c; and a drive control device 44d for controlling the shift amounts of the tilt driving section 44a and horizontal rotational drive section 44b.

The tilt driving section 44a and the horizontal rotational drive section 44b can perform rotation around the vertical axis, and rotation around the horizontal axis with a predetermined angle, and can be driven in the each rotational direction by a mechanism such as a control motor (not shown in the figures) or the like which is capable of controlling the rotational angles.

The drive control device 44d is a device which, based upon the control signals which are generated by the control device 41, calculates rotational drive amounts for the tilt driving section 44a and the horizontal rotational drive section 44b, and performs predetermined rotational driving thereof.

According to the optical system 100 of the present embodiment, the incident luminous flux 51 which is incident into the aperture iris 43a forms images onto the light reception elements 29, 63, and 46. The light reception element 46 extracts and transmits an input signal which is transmitted by the incident luminous flux 51.

At this time, if the optical path of the incident luminous flux 51 has an incident angle with respect to the aperture iris 43a, due to the variance of the optical path of the incident luminous flux 51 or due to an inappropriate direction of the light condensing unit 60, then imaging positions of each will shift. However, in the present embodiment, since the shift amount of the imaging position upon the light reception element 29 is detected by the control device 41, it is possible to drive the gimbal stage 44 using a control signal transferred to the drive control device 44d; thereby enabling controlling the attitude of the light condensing unit 60.

The light reception element 63 detects a very small shift of the imaging position, and the position detection signal is transmitted to the deflection control device 62a by the control device 63a. By performing this, it is possible to control so as to cancel the shift of the imaging position by varying the deflection angle of the Galvano mirror 62.

Normally, a signal that should be extracted within the optical system 100 is often sensitive to a variance of the incident angle, since there are cases in which: the signal has a large magnification like, for example, a telescope; or the signal contains a signal noise derived from the variance of the light reception amount level, like optical communications. As a result, if the attitude control is to be made only by the gimbal stage 44, a mechanism having a high precision and a high speed response becomes necessary; therefore, there is a case in which a device becomes extremely expensive.

Therefore, the attitude control by the gimbal stage 44 is made to a rough shifting in order to perform a shifting in the case of being extremely far from a control target. In addition, as for a more precise positioning, it is made such that an imaging position upon the light reception element 63 becomes constant, by controlling the Galvano mirror 62 which can be driven at high speed by the deflection control device 62a. Thereby, it becomes possible to perform imaging upon a constant position of the light reception element 63 without providing a mechanism having high accuracy and high speed responsiveness, thereby always enabling a stable light reception state to be secured.

Therefore, according to the optical system 100 of the present embodiment, along with exhibiting the same operations and beneficial effects as the second embodiment described above, it is also possible to perform an optical tracking of the incident light with high accuracy and high efficiency.

Furthermore, in the present embodiment, since imaging performance such as a focal length can be changed between the reflection optical path and the transmission optical path, it is possible to change the shifting amount of an image upon the light reception elements 29 and 63 when the incident angle is varied. Accordingly, a configuration may be employed in which the shifting amount in a wide range is detected by one of the light reception elements while detecting the shifting amount in a small range by another optical element; and furthermore, it may be arranged such that a detection signal of the former (i.e., the shifting amount within the wide range) is used for controlling a rough shifting of the gimbal stage 44, while a detection signal of the latter (i.e., the shifting amount within the small range) is used for controlling a fine shifting. By employing this, it becomes possible to quickly shift within a wide range by the former, and to make a fine shifting with high precision by the latter after approaching the target position. As a result, a shifting control with high precision can be performed as a whole system.

Moreover, in the above-mentioned first embodiment or the above-mentioned second embodiment, an appropriate combination of any definition Equations can be applied.

In the above described first embodiment or the second embodiment, although the explanation was made, by way of example, in terms of a reflective coating or a half mirror coating which can control the reflection ratio for internally incident light being applied to the third surface, it would also be acceptable to employ a different coating for making the third surface into a splitting surface.

For example, it would be acceptable to perform polarized beam splitter coating (PBS coating), so as to perform splitting according to the polarization state of the luminous flux which arrives at the third surface. By changing the PBS coating according to the state of polarization before the input light arrives at the third surface, it is possible to adjust the optical splitting ratio. Furthermore, according to requirements, it would also be acceptable to provide, in an appropriate position, an optical element which alters the state of polarization, such as an appropriate light polarization element or the like.

For example, it would be acceptable to apply a dichroic beam splitter coating, and to perform splitting according to the wavelength of the luminous flux which arrives at the third surface.

Although, in the above described first embodiment or the second embodiment, the explanation was made, by way of example, in terms of two image surfaces being defined exterior to the prism, it would also be acceptable to provide a splitting surface upon the optical path exterior to the prism, thereby splitting the luminous flux into a plurality of optical paths, and to define a plurality of image surfaces. In such a case, it would be possible to arrange a light reception element or a position detection device at each of the image surfaces; accordingly, by using their outputs, it would be possible to perform position detection at even higher accuracy.

Although, in the above-mentioned third embodiment, by way of example, the case was explained in which the prism 71 and the lens 17 are used for the decentering optical system, as shown in the second embodiment described above, the prism 71 may be combined with optical elements such as, for example, the prism 41 and another prism, or a lens.

In the third embodiment described above, an explanation was made for a case in which the Galvano mirror 62 is disposed at a position near the exit pupil 19 in order to make the size of the reflective surface of the Galvano mirror 62 small; however, the Galvano mirror 62 may be disposed at a position apart from the exit pupil 19 in the case where, for example, variance of the incident angle is small, or the Galvano mirror 62 has sufficient effective reflective surface, or the like.

Furthermore, in such a case, it is not necessary to form an exit pupil for the decentering optical system. That is, all of the decentering optical system of the first embodiment described above may be employed for the decentering optical system utilized in the optical system of the third embodiment described above.

In addition, in the explanation of the third embodiment described above, an explanation was made for an example of an optical system which is preferably applicable to free-space communications or the like, by transferring and receiving the modulated light; however, the optical system of the present invention is not limited to this. For example, by applying it to a telescope, it is possible to construct a high performance optical system which is equipped with a tracking function, observation optical path of two-line system, or the like, while realizing a small size. In this manner, the optical system of the present invention is widely applicable to an observation system which focuses on a focusing surface.

First Preferred Numerical Value Embodiment

Next, a first preferred numerical value embodiment of the decentering optical system according to the first embodiment described above will be explained with reference to FIGS. 2A and 2B.

In the following, the structural parameters of an optical system according to the present first preferred numerical embodiment are specified. $r_i$ and $d_i$ (where i is an integer) shown in FIGS. 2A and 2B correspond to structural parameters $r_i$ and $d_i$ of the optical system described below. The refractive indexes given for d-rays (of wavelength 587.56 nm) are shown. These specifications are common to all of the reference figures below.

The optical path 1 is the optical path along which the luminous flux which is reflected from the splitting surface 5 proceeds (refer to FIG. 2A), and the optical path 2 is the optical path along which the luminous flux which is transmitted through the splitting surface 6 proceeds (refer to FIG. 2B).

It should be understood that, among the data for the freely curved surfaces (FFS) and for the decentering surfaces, for those items which are common to the optical paths 1 and 2, common numbers within brackets [ ]are appended, and duplication is omitted.

As for the coordinate system, the XYZ orthogonal coordinate system already explained is employed. In this coordinate system, as for the angles of inclination, if they are respectively taken as $\alpha$, $\beta$, and $\gamma$ when the X axis, the Y axis, and the Z axis are taken as centers, then positive values for the angles of inclination $\alpha$ and $\beta$ are defined as being angles in the anticlockwise direction with respect to the positive directions of the X axis and the Y axis, and positive values for the angle of inclination $\gamma$ are defined as being angles in the clockwise direction with respect to the positive direction of the Z axis.

When each of the optical surfaces is to be expressed in a coordinate system, the coordinate system is defined by a local coordinate system in which, when the axial principal ray 50 has been light beam tracked in order from the body in the direction towards the image surfaces, taking the point at which the optical surface and the axial principal ray 50 cross over as the origin, and, in the state with the X axis being oriented in the vertical direction with respect to the drawing paper, rotating the Y axis and the Z axis so that the Z axis is made to agree with the axial principal ray 50.

Moreover, as for the directions of rotation through $\alpha$, $\beta$, and $\gamma$ of the central axis of the surface: first, the central axis of the surface and its XYZ orthogonal coordinate system are rotated through the angle $\alpha$ in the anticlockwise direction around the X axis; next, along with rotating the central axis of the surface which has thus been rotated through the angle $\beta$ in the anticlockwise direction about the Y axis of the new coordinate system, this coordinate system which has thus been once rotated is also rotated through the angle $\beta$ in the anticlockwise direction about the Y axis as well; and then the central axis of the surface which has thus been twice rotated is rotated through the angle γ in the clockwise direction about the Z axis of the new coordinate system.

As for the shape of the rotationally asymmetric curved surface which is utilized in the present embodiment, for example, it is described by a freely curved surface Equation which is expressed in Definition Equation (a) given below. The Z axis of this Definition Equation (a) becomes the axis of the freely curved surface.

$$Z = \frac{(r^2/R)}{\left[1 + \sqrt{\{1-(1+k)(r/R)^2\}}\right]} + \sum_{j=1}^{66} C_j X^m Y^n \quad (a)$$

Here, the first term in Definition Equation (a) is a spherical surface term, and the second term is a freely curved surface term. In the spherical surface term, R is the paraxial curvature radius of the apex, k is the conic constant (a circular conical constant), and $r = \sqrt{(X^2 + Y^2)}$.

The freely curved surface term will be expressed by the following equation.

$$\sum_{j=1}^{66} C_j X^m Y^n = C_1 + C_2 X + C_3 Y + C_4 X^2 + C_5 XY + C_6 Y^2 +$$
$$C_7 X^3 + C_8 X^2 Y + C_9 XY^2 + C_{10} Y^3 + C_{11} X^4 +$$
$$C_{12} X^3 Y + C_{13} X^2 Y^2 + C_{14} XY^3 + C_{15} Y^4 + C_{16} X^5 +$$
$$C_{17} X^4 Y + C_{18} X^3 Y^2 + C_{19} X^2 Y^3 + C_{20} XY^4 +$$
$$C_{21} Y^5 + C_{22} X^6 + C_{23} X^5 Y + C_{24} X^4 Y^2 +$$
$$C_{25} X^3 Y^3 + C_{26} X^2 Y^4 + C_{27} XY^5 + C_{28} Y^6 +$$
$$C_{29} X^7 + C_{30} X^6 Y + C_{31} X^5 Y^2 + C_{32} X^4 Y^3 +$$
$$C_{33} X^3 Y^4 + C_{34} X^2 Y^5 + C_{35} XY^6 + C_{36} Y^7$$
$$\ldots$$

where $C_j$ (j is an integer greater than 1) is a coefficient.

The above described freely curved surface, generally, does not have X-Z or Y-Z planes of symmetry; but, in the present embodiment, by making all of the terms for which the power of X is odd zero, it becomes a freely curved surface in which just one plane of symmetry exists parallel to the Y-Z plane. For example, the above is possible by making all of the coefficients $C_2$, $C_5$, $C_7$, $C_9$, $C_{12}$, $C_{14}$, $C_{16}$, $C_{18}$, $C_{20}$, $C_{23}$, $C_{25}$, $C_{27}$, $C_{29}$, $C_{31}$, $C_{33}$, $C_{35}$, ... of each of the terms in the above described Definition Equation (a) zero.

Furthermore, the aspheric surface which is used in the present embodiment is a rotationally symmetric aspheric surface which is defined by the following Definition Equation (b):

$$Z = \frac{ch^2}{1 + \sqrt{1-(1+k)c^2 h^2}} + Ah^4 + Bh^6 + Ch^8 + \ldots \quad (b)$$

Here, $h = \sqrt{(X^2 + Y^2)}$, c is the paraxial curvature radius of the apex, k is a conic constant (a circular conical constant), and A, B, C, D, ... are, respectively, the aspheric surface coefficients of the fourth power, the sixth power, the eighth power, the tenth power, . . . . The Z axis of this Definition Equation (b) becomes the axis of the rotationally asymmetric surface.

In structural parameters shown in the following, the units of length are (mm), and the units of angle are (°). In addition, each decentering data employs a center of the iris surface as the origin. Furthermore, items related to the freely curved surfaces or the aspheric surfaces for which no data is given have the value zero.

(Optical path 1)

| Surface Number Body Surface | Curvature Radius | Surface Gap | Eccentricity | Refractive Index | Abbe Number |
|---|---|---|---|---|---|
| | ∞ | ∞ | | | |
| 1 | ∞ (iris surface) | $d_1 = 0.00$ | | | |
| 2 | FFS[1] | $d_2 = 0.00$ | eccentricity [1] | $n_1 = 1.5254$ | $v_1 = 56.2$ |
| 3 | FFS[2] | $d_3 = 0.00$ | eccentricity [2] | $n_2 = 1.5254$ | $v_2 = 56.2$ |
| 4 | FFS[1] | $d_4 = 0.00$ | eccentricity [1] | $n_3 = 1.5254$ | $v_3 = 56.2$ |
| 5 | FFS[3] | $d_5 = 0.00$ | eccentricity [3] | $n_4 = 1.5254$ | $v_4 = 56.2$ |
| 6 | FFS[4] | $d_6 = 0.00$ | eccentricity [4] | | |
| image plane | ∞ | $d_7 = 0.00$ | eccentricity [5] | | |

| | | | |
|---|---|---|---|
| FFS[1]: | $C_4 = -9.6586 \times 10^{-4}$ | $C_6 = -1.2250 \times 10^{-3}$ | $C_8 = -2.7264 \times 10^{-5}$ |
| | $C_{10} = -8.1545 \times 10^{-6}$ | | |
| FFS[2]: | $C_4 = -2.4676 \times 10^{-3}$ | $C_6 = -2.7217 \times 10^{-3}$ | $C_8 = -9.1686 \times 10^{-6}$ |
| | $C_{10} = -9.6970 \times 10^{-7}$ | $C_{11} = -1.4874 \times 10^{-9}$ | $C_{13} = 2.9815 \times 10^{-8}$ |
| | $C_{15} = -1.2545 \times 10^{-8}$ | $C_{17} = -4.4630 \times 10^{-10}$ | $C_{19} = -5.6503 \times 10^{-10}$ |
| | $C_{21} = 7.4406 \times 10^{-11}$ | $C_{22} = -7.4801 \times 10^{-12}$ | $C_{24} = 3.7528 \times 10^{-12}$ |
| | $C_{26} = 8.4095 \times 10^{-12}$ | $C_{28} = 2.1589 \times 10^{-12}$ | |
| FFS[3]: | $C_4 = 1.1374 \times 10^{-3}$ | $C_6 = 7.7325 \times 10^{-4}$ | $C_8 = -1.7902 \times 10^{-5}$ |
| | $C_{10} = -1.8865 \times 10^{-5}$ | $C_{11} = -1.2416 \times 10^{-7}$ | $C_{13} = 1.8818 \times 10^{-7}$ |
| | $C_{15} = 2.0332 \times 10^{-7}$ | $C_{17} = 2.3263 \times 10^{-8}$ | $C_{19} = -8.0184 \times 10^{-9}$ |
| | $C_{21} = 2.4869 \times 10^{-8}$ | $C_{22} = 1.7141 \times 10^{-10}$ | |
| FFS[4]: | $C_4 = 2.6060 \times 10^{-2}$ | $C_6 = 2.7579 \times 10^{-2}$ | $C_8 = -2.3613 \times 10^{-4}$ |
| | $C_{10} = -1.9268 \times 10^{-3}$ | $C_{11} = -9.0525 \times 10^{-5}$ | $C_{13} = -1.1175 \times 10^{-4}$ |
| | $C_{15} = -1.2335 \times 10^{-4}$ | | |

-continued (Optical path 1)

| | | | |
|---|---|---|---|
| eccentricity [1]: | X = 0.00 | Y = 8.68 | Z = 19.49 |
| | α = 11.94 | β = 0.00 | γ = 0.00 |
| eccentricity [2]: | X = 0.00 | Y = 1.87 | Z = 50.00 |
| | α = −16.41 | β = 0.00 | γ = 0.00 |
| eccentricity [3]: | X = 0.00 | Y = 52.17 | Z = 25.13 |
| | α = 80.58 | β = 0.00 | γ = 0.00 |
| eccentricity [4]: | X = 0.00 | Y = −25.71 | Z = 30.70 |
| | α = 90.24 | β = 0.00 | γ = 0.00 |
| eccentricity [5]: | X = 0.00 | Y = −35.65 | Z = 31.76 |
| | α = 92.27 | β = 0.00 | γ = 0.00 |

(Optical path 2)

| Surface Number Body Surface | Curvature Radius | Surface Gap | Eccentricity | Refractive Index | Abbe Number |
|---|---|---|---|---|---|
| 1 | ∞ (iris surface) | $d_1 = 0.00$ | | | |
| 2 | FFS[1] | $d_2 = 0.00$ | eccentricity [1] | $n_1 = 1.5254$ | $v_1 = 56.2$ |
| 3 | FFS[2] | $d_3 = 0.00$ | eccentricity [2] | $n_2 = 1.5254$ | $v_2 = 56.2$ |
| 4 | FFS[1] | $d_4 = 0.00$ | eccentricity [1] | $n_3 = 1.5254$ | $v_3 = 56.2$ |
| 5 | FFS[3] | $d_8 = 0.00$ | eccentricity [3] | | |
| image plane | ∞ | $d_9 = 0.00$ | eccentricity [6] | | |

| | | | |
|---|---|---|---|
| eccentricity [6]: | X = 0.00 | Y = 93.55 | Z = 49.21 |
| | α = 66.33 | β = 0.00 | γ = 0.00 |

Among the characteristic optical values of the decentering optical system of the present preferred numerical value embodiment, the paraxial focal lengths F to each of the image surfaces along the reflection optical path and the transmission optical path, and calculated values for Definition Equations (1) to (7) are shown in the following Table along with the values for the other preferred numerical value embodiments.

The entrance pupil diameter D is D=φ40 mm, and the angle of view for each in the horizontal (in the X axis direction) and in the vertical (in the Y axis direction) is 1°. In addition, the subscripts X and Y denote distances and rotational angles related to the X and the Y axis direction respectively.

In addition, the wavelength λ of the light source is set to λ=780 nm, and in this case, the refractive index N of the medium of the prism 1 is N=1.519. That is, $$\sin^{-1}(1/N) = 41.17 \tag{A}$$

and the above Equations (2) and (4) will be the following Equations (2A) and (4A) respectively.

$$37.05° \leq \theta_{1al} \leq 61.76° \tag{2A}$$

$$4.12° \leq \theta_{3al} \leq 39.11° \tag{4A}$$

These are common for each of the preferred numerical value embodiments.

TABLE 1

| | Unit | Equation | Embodiment 1 | Embodiment 2 | Embodiment 3 | Embodiment 4 | Embodiment 5 | Notes |
|---|---|---|---|---|---|---|---|---|
| Incident Pupil Diameter D | (mm) | | 40 | 40 | 40 | 40 | 40 | |
| $(F/D)_Y$ | | Equation (1) | 2.96 | 1.96 | 2.57 | 1.65 | 1.51 | Optical path 1 |
| $(F/D)_X$ | | Equation (1) | 2.64 | 2.64 | 4.75 | 1.41 | 1.49 | Optical path 1 |
| $(F/D)_Y$ | | Equation (1) | 3.14 | 3.63 | 3.44 | 2.16 | 2.45 | Optical path 2 |
| $(F/D)_X$ | | Equation (1) | 2.65 | 3.05 | 3.32 | 2.14 | 2.35 | Optical path 2 |
| $\theta_{1n}$ | (°) | Equation (3) | 51.810 | 51.77 | 51.51 | 49.32 | 50.10 | |
| $\theta_{1nal}$ | (°) | Equation (2) | 61.878 | 61.03 | 60.59 | 57.41 | 59.10 | Maximum value |
| $\theta_{1nal}$ | (°) | Equation (2) | 42.000 | 42.94 | 42.00 | 41.96 | 42.00 | Minimum value |
| $\theta_{3n}$ | (°) | Equation (5) | 13.51 | 14.95 | 17.21 | 15.62 | 15.36 | |
| $\theta_{3nal}$ | (°) | Equation (4) | 19.76 | 20.64 | 22.30 | 23.32 | 23.52 | Maximum value |
| $\theta_{3nal}$ | (°) | Equation (4) | 7.39 | 9.41 | 11.76 | 8.15 | 7.19 | Minimum value |
| $|\theta_3 - \theta_2|$ | (°) | Equation (6) | 97.00 | 98.12 | 66.63 | 93.20 | 93.87 | |
| $|\theta_4 - \theta_3|$ | (°) | Equation (7) | 9.65 | 16.46 | 25.00 | 18.76 | 10.17 | |

Accordingly, the decentering optical system shown in the present preferred numerical value embodiment satisfies the Equations (1) through (7), and also further satisfies the Equations (1b) and (7a).

Figure 8:
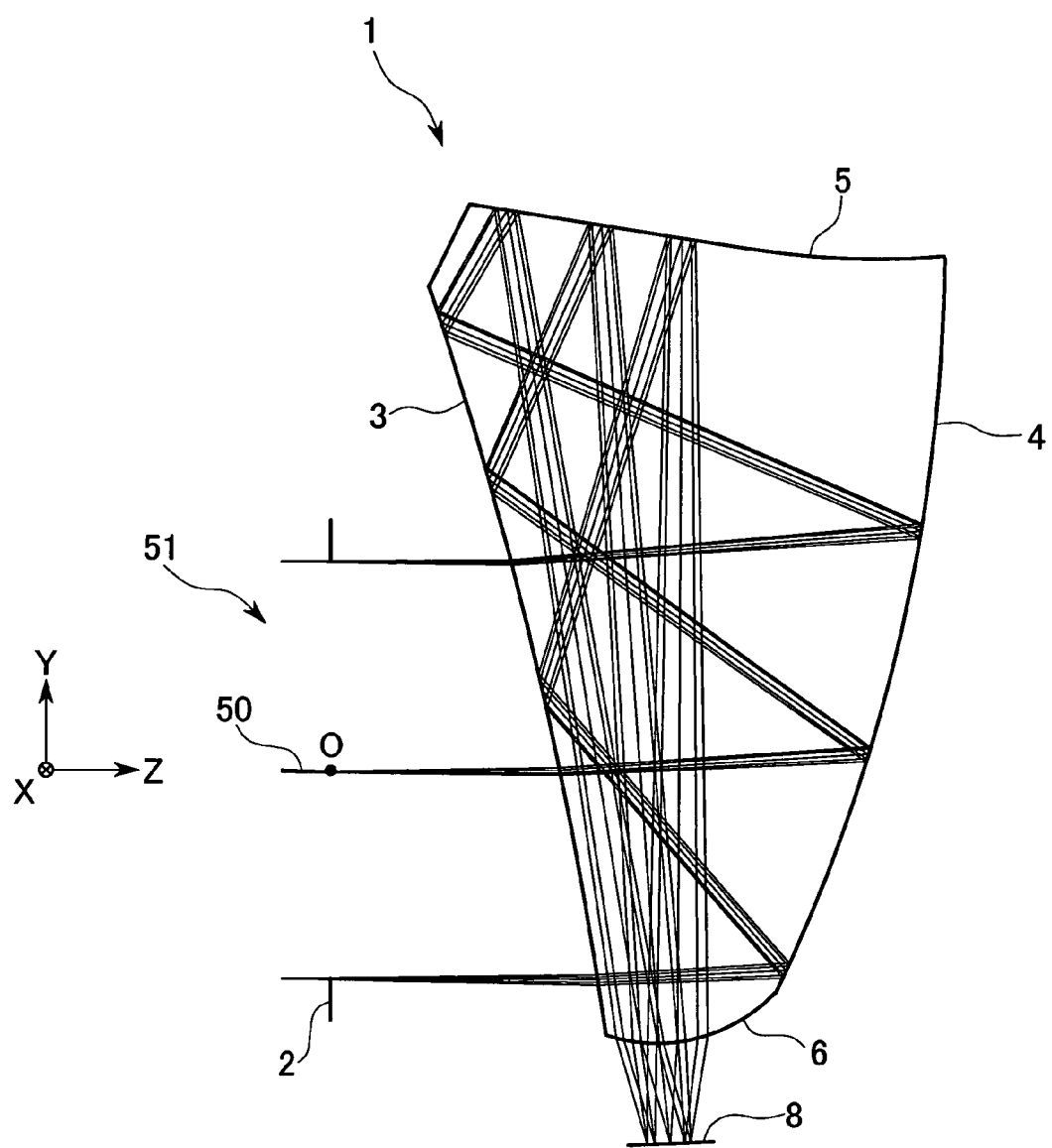
FIG. 8 is an optical path diagram of an optical path 1 (reflection optical path) in a first preferred numerical value embodiment, including, in cross section, an axial principal ray.
Figure 9:
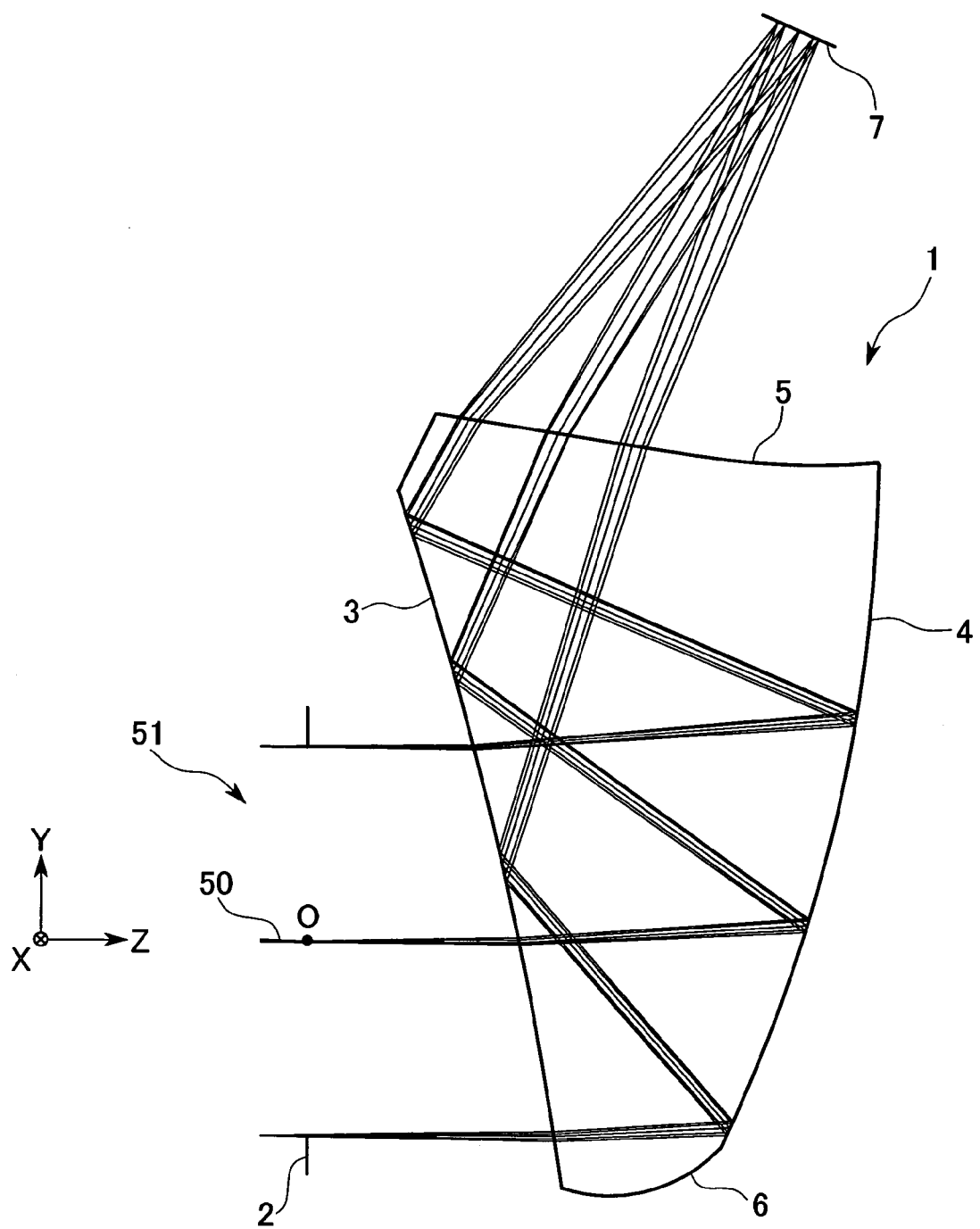
FIG. 9 is an optical path diagram of an optical path 2 (transmission optical path) in a first preferred numerical value embodiment, including, in cross section, an axial principal ray.

These optical path diagrams each having a Y-Z plane cross section will be shown in FIGS. 8 and 9, corresponding to the optical paths 1 and 2.

Second Preferred Numerical Value Embodiment

Next, a second preferred numerical value embodiment which is related to the first variant example of the decentering optical system according to the first embodiment described above will be shown (refer to FIGS. 3A and 3B).

| (Optical path 1) | | | | | |
|---|---|---|---|---|---|
| Surface Number Body Surface | Curvature Radius ∞ | Surface Gap ∞ | Eccentricity | Refractive Index | Abbe Number |
| 1 | ∞ (iris surface) | $d_1 = 0.00$ | | | |
| 2 | aspheric surface [1] | $d_2 = 0.00$ | eccentricity [1] | $n_1 = 1.5254$ | $v_{1\ =\ 56.2}$ |
| 3 | FFS[1] | $d_3 = 0.00$ | eccentricity [2] | $n_2 = 1.5254$ | $v_2 = 56.2$ |
| 4 | aspheric surface [1] | $d_4 = 0.00$ | eccentricity [1] | $n_3 = 1.5254$ | $v_3 = 56.2$ |
| 5 | ∞ | $d_5 = 0.00$ | eccentricity [3] | $n_4 = 1.5254$ | $v_4 = 56.2$ |
| 6 | FFS[2] | $d_6 = 0.00$ | eccentricity [4] | | |
| image plane | ∞ | $d_7 = 0.00$ | eccentricity [5] | | | aspheric surface [1]: $c = -255.97$  $k = 0.00$  $A = 7.0613 \times 10^{-7}$
$B = -5.1269 \times 10^{-10}$  $C = 1.4043 \times 10^{-13}$  $D = -9.0889 \times 10^{-18}$ FFS[1]: $C_4 = -2.4539 \times 10^{-3}$  $C_6 = -2.4885 \times 10^{-3}$  $C_8 = 1.5968 \times 10^{-6}$
$C_{10} = -2.7389 \times 10^{-6}$  $C_{11} = 1.1660 \times 10^{-7}$  $C_{13} = -1.8195 \times 10^{-7}$
$C_{15} = -3.5591 \times 10^{-7}$  $C_{17} = -1.4414 \times 10^{-9}$  $C_{19} = 7.4757 \times 10^{-10}$
$C_{21} = 5.5904 \times 10^{-9}$  $C_{22} = -7.8124 \times 10^{-11}$  $C_{24} = -2.1909 \times 10^{-11}$
$C_{26} = 2.4093 \times 10^{-10}$  $C_{28} = 2.1620 \times 10^{-10}$ FFS[2]: $C_4 = 9.8326 \times 10^{-3}$  $C_6 = 3.9883 \times 10^{-2}$  $C_8 = 1.9852 \times 10^{-4}$
$C_{10} = 3.5669 \times 10^{-4}$  $C_{11} = 4.7049 \times 10^{-5}$  $C_{13} = 1.3231 \times 10^{-5}$
$C_{15} = -8.1308 \times 10^{-5}$  $C_{17} = -3.6421 \times 10^{-5}$

| eccentricity [1]: | $X = 0.00$ | $Y = 6.48$ | $Z = 21.31$ |
| | $\alpha = 10.28$ | $\beta = 0.00$ | $\gamma = 0.00$ |
| eccentricity [2]: | $X = 0.00$ | $Y = 1.47$ | $Z = 49.85$ |
| | $\alpha = -17.30$ | $\beta = 0.00$ | $\gamma = 0.00$ |
| eccentricity [3]: | $X = 0.00$ | $Y = 53.29$ | $Z = 28.60$ |
| | $\alpha = 80.82$ | $\beta = 0.00$ | $\gamma = 0.00$ |
| eccentricity [4]: | $X = 0.00$ | $Y = -24.99$ | $Z = 36.52$ |
| | $\alpha = 97.28$ | $\beta = 0.00$ | $\gamma = 0.00$ |
| eccentricity [5]: | $X = 0.00$ | $Y = -35.72$ | $Z = 37.45$ |
| | $\alpha = 89.13$ | $\beta = 0.00$ | $\gamma = 0.00$ |

| (Optical path 2) | | | | | |
|---|---|---|---|---|---|
| Surface Number Body Surface | Curvature Radius ∞ | Surface Gap ∞ | Eccentricity | Refractive Index | Abbe Number |
| 1 | ∞ (iris surface) | $d_1 = 0.00$ | | | |
| 2 | aspheric surface [1] | $d_2 = 0.00$ | eccentricity [1] | $n_1 = 1.5254$ | $v_1 = 56.2$ |
| 3 | FFS[1] | $d_3 = 0.00$ | eccentricity [2] | $n_2 = 1.5254$ | $v_2 = 56.2$ |
| 4 | aspheric surface [1] | $d_4 = 0.00$ | eccentricity [1] | $n_3 = 1.5254$ | $v_3 = 56.2$ |
| 5 | ∞ | $d_8 = 0.00$ | eccentricity [3] | | |
| image plane | ∞ | $d_9 = 0.00$ | eccentricity [6] | | |

| eccentricity [6]: | $X = 0.00$ | $Y = 110.00$ | $Z = 65.00$ |
| | $\alpha = 75.00$ | $\beta = 0.00$ | $\gamma = 0.00$ |

The decentering optical system shown in the present preferred numerical value embodiment satisfies the Definition Equations (1) through (7) as shown in Table 1, and also further satisfies the Definition Equations (1b) and (7a).

| (Optical path 1) | | | | | |
|---|---|---|---|---|---|
| Surface Number Body Surface | Curvature Radius | Surface Gap | Eccentricity | Refractive Index | Abbe Number |
| 1 | ∞ (iris surface) | $d_1 = 0.00$ | | | |
| 2 | FFS[1] | $d_2 = 0.00$ | eccentricity [1] | $n_1 = 1.5254$ | $\nu_1 = 56.2$ |
| 3 | FFS[2] | $d_3 = 0.00$ | eccentricity [2] | $n_2 = 1.5254$ | $\nu_2 = 56.2$ |
| 4 | FFS[1] | $d_4 = 0.00$ | eccentricity [1] | $n_3 = 1.5254$ | $\nu_3 = 56.2$ |
| 5 | FFS[3] | $d_5 = 0.00$ | eccentricity [3] | $n_4 = 1.5254$ | $\nu_4 = 56.2$ |
| 6 | FFS[4] | $d_6 = 0.00$ | eccentricity [4] | | |
| image plane | ∞ | $d_7 = 0.00$ | eccentricity [5] | | |
| FFS[1]: | $C_4 = -3.3917 \times 10^{-3}$ | $C_6 = -8.8435 \times 10^{-4}$ | $C_8 = -7.5463 \times 10^{-5}$ | | |
| | $C_{10} = -8.3749 \times 10^{-6}$ | | | | |
| FFS[2]: | $C_4 = -3.4159 \times 10^{-3}$ | $C_6 = -2.4612 \times 10^{-3}$ | $C_8 = -1.9123 \times 10^{-5}$ | | |
| | $C_{10} = -3.2478 \times 10^{-6}$ | $C_{11} = -4.6052 \times 10^{-8}$ | $C_{13} = 1.4060 \times 10^{-7}$ | | |
| | $C_{15} = -8.6199 \times 10^{-9}$ | $C_{17} = -2.5263 \times 10^{-10}$ | $C_{19} = -2.8801 \times 10^{-9}$ | | |
| | $C_{21} = -3.7029 \times 10^{-10}$ | $C_{22} = 1.8663 \times 10^{-12}$ | $C_{24} = 1.1136 \times 10^{-11}$ | | |
| | $C_{26} = 4.1585 \times 10^{-11}$ | $C_{28} = 5.3376 \times 10^{-12}$ | | | |
| FFS[3]: | $C_4 = -6.6541 \times 10^{-4}$ | $C_6 = 2.1959 \times 10^{-3}$ | $C_8 = 7.2060 \times 10^{-5}$ | | |
| | $C_{10} = -1.8181 \times 10^{-5}$ | $C_{11} = 6.2629 \times 10^{-7}$ | $C_{13} = -5.6365 \times 10^{-7}$ | | |
| | $C_{15} = 1.8707 \times 10^{-7}$ | $C_{17} = -1.4998 \times 10^{-7}$ | $C_{19} = 4.4522 \times 10^{-8}$ | | |
| | $C_{21} = 1.2816 \times 10^{-7}$ | $C_{22} = 7.1215 \times 10^{-9}$ | | | |
| FFS[4]: | $C_4 = -1.7622 \times 10^{-2}$ | $C_6 = 3.0878 \times 10^{-2}$ | $C_8 = 6.3868 \times 10^{-4}$ | | |
| | $C_{10} = 2.5563 \times 10^{-4}$ | $C_{11} = 6.1673 \times 10^{-5}$ | $C_{13} = -2.8868 \times 10^{-5}$ | | |
| | $C_{15} = -2.7996 \times 10^{-6}$ | | | | |
| eccentricity [1]: | $X = 0.00$ | $Y = 7.82$ | $Z = 21.22$ | | |
| | $\alpha = 11.65$ | $\beta = 0.00$ | $\gamma = 0.00$ | | |
| eccentricity [2]: | $X = 0.00$ | $Y = 1.92$ | $Z = 52.00$ | | |
| | $\alpha = -16.63$ | $\beta = 0.00$ | $\gamma = 0.00$ | | |
| eccentricity [3]: | $X = 0.00$ | $Y = 70.00$ | $Z = 40.00$ | | |
| | $\alpha = 50.00$ | $\beta = 0.00$ | $\gamma = 0.00$ | | |
| eccentricity [4]: | $X = 0.00$ | $Y = -60.00$ | $Z = 5.00$ | | |
| | $\alpha = 25.00$ | $\beta = 0.00$ | $\gamma = 0.00$ | | |
| eccentricity [5]: | $X = 0.00$ | $Y = -45.04$ | $Z = -13.64$ | | |
| | $\alpha = 16.55$ | $\beta = 0.00$ | $\gamma = 0.00$ | | |

Third Preferred Numerical Value Embodiment

Next, a third preferred numerical value embodiment which is related to the second variant example of the decentering optical system according to the first embodiment described above will be shown (refer to FIGS. 4A and 4B).

| (Optical path 2) | | | | | |
|---|---|---|---|---|---|
| Surface Number Body Surface | Curvature Radius | Surface Gap | Eccentricity | Refractive Index | Abbe Number |
| 1 | ∞ (iris surface) | $d_1 = 0.00$ | | | |
| 2 | FFS[1] | $d_2 = 0.00$ | eccentricity [1] | $n_1 = 1.5254$ | $\nu_1 = 56.2$ |
| 3 | FFS[2] | $d_3 = 0.00$ | eccentricity [2] | $n_2 = 1.5254$ | $\nu_2 = 56.2$ |
| 4 | FFS[1] | $d_4 = 0.00$ | eccentricity [1] | $n_3 = 1.5254$ | $\nu_3 = 56.2$ |
| 5 | FFS[3] | $d_8 = 0.00$ | eccentricity [3] | | |
| image plane | ∞ | $d_9 = 0.00$ | eccentricity [6] | | |
| eccentricity [6]: | $X = 0.00$ | $Y = 111.92$ | $Z = 46.18$ | | |
| | $\alpha = 87.30$ | $\beta = 0.00$ | $\gamma = 0.00$ | | |

The decentering optical system shown in the present preferred numerical value embodiment satisfies the Definition Equations (1) through (7) as shown in Table 1, and also further satisfies the Definition Equations (1b), (7a), and (8a).

| (Optical path 1) | | | | | |
|---|---|---|---|---|---|
| Surface Number Body Surface | Curvature Radius ∞ | Surface Gap ∞ | Eccentricity | Refractive Index | Abbe Number |
| 1 | ∞ (iris surface) | $d_1 = 0.00$ | | | |
| 2 | aspheric surface [1] | $d_2 = 0.00$ | eccentricity [1] | $n_1 = 1.5254$ | $v_1 = 56.2$ |
| 3 | FFS[1] | $d_3 = 0.00$ | eccentricity [2] | $n_2 = 1.5254$ | $v_2 = 56.2$ |
| 4 | aspheric surface [1] | $d_4 = 0.00$ | eccentricity [1] | $n_3 = 1.5254$ | $v_3 = 56.2$ |
| 5 | FFS[2] | $d_5 = 0.00$ | eccentricity [3] | $n_4 = 1.5254$ | $v_4 = 56.2$ |
| 6 | FFS[3] | $d_6 = 0.00$ | eccentricity [4] | | |
| 7 | aspheric surface [2] | $d_7 = 5.48$ | eccentricity [5] | $n_5 = 1.5163$ | $v_5 = 64.1$ |
| 8 | aspheric surface [3] | $d_8 = 0.00$ | | | |
| image plane | ∞ | $d_9 = 0.00$ | eccentricity [6] | | | aspheric surface [1]: $c = -734.21$   $k = 0.00$   $A = 1.5798 \times 10^{-9}$
$B = -5.1476 \times 10^{-11}$   $C = 3.8834 \times 10^{-14}$   $D = -7.9756 \times 10^{-18}$ aspheric surface [2]: $c = -5.84$   $k = -7.4452 \times 10^{-1}$   $A = 2.4242 \times 10^{-4}$
$B = 6.5258 \times 10^{-6}$ aspheric surface [3]: $c = 342.36$   $k = -6.0062 \times 10^{+5}$   $A = -3.2595 \times 10^{-4}$
$B = 1.6254 \times 10^{-5}$ FFS[1]:
$C_4 = -1.9732 \times 10^{-3}$   $C_6 = -1.9276 \times 10^{-3}$   $C_8 = 7.6495 \times 10^{-7}$
$C_{10} = 1.4622 \times 10^{-6}$   $C_{11} = 4.2494 \times 10^{-8}$   $C_{13} = -2.0452 \times 10^{-8}$
$C_{15} = 2.5326 \times 10^{-8}$   $C_{17} = 4.4426 \times 10^{-10}$   $C_{19} = 1.9391 \times 10^{-9}$
$C_{21} = 1.5547 \times 10^{-9}$   $C_{22} = -8.3803 \times 10^{-11}$   $C_{24} = 8.9266 \times 10^{-12}$
$C_{26} = 1.7947 \times 10^{-11}$   $C_{28} = -1.1363 \times 10^{-11}$ FFS[2]:
$C_4 = 9.1499 \times 10^{-4}$   $C_6 = -1.2344 \times 10^{-3}$   $C_8 = -1.0343 \times 10^{-5}$
$C_{10} = -1.0541 \times 10^{-5}$   $C_{11} = -7.2966 \times 10^{-7}$   $C_{13} = -3.2722 \times 10^{-7}$
$C_{15} = -3.5703 \times 10^{-8}$   $C_{17} = 6.5250 \times 10^{-10}$   $C_{19} = 5.0019 \times 10^{-9}$
$C_{21} = 8.7666 \times 10^{-9}$   $C_{22} = 2.2620 \times 10^{-9}$ FFS[3]:
$C_4 = 1.0538 \times 10^{-1}$   $C_6 = 1.0268 \times 10^{-1}$   $C_8 = 1.2744 \times 10^{-3}$
$C_{10} = 5.8787 \times 10^{-4}$   $C_{11} = -2.2883 \times 10^{-6}$   $C_{13} = -9.6771 \times 10^{-4}$
$C_{15} = 6.9839 \times 10^{-5}$   $C_{17} = -4.0956 \times 10^{-5}$   $C_{19} = -8.1032 \times 10^{-5}$
$C_{21} = 4.6619 \times 10^{-6}$   $C_{22} = 2.9929 \times 10^{-7}$   $C_{24} = 7.3723 \times 10^{-5}$
$C_{26} = 5.0392 \times 10^{-5}$   $C_{28} = -2.0042 \times 10^{-6}$

| | | | |
|---|---|---|---|
| eccentricity [1]: | $X = 0.00$ | $Y = 6.64$ | $Z = 19.13$ |
| | $\alpha = 8.23$ | $\beta = 0.00$ | $\gamma = 0.00$ |
| eccentricity [2]: | $X = 0.00$ | $Y = 1.34$ | $Z = 47.45$ |
| | $\alpha = -18.38$ | $\beta = 0.00$ | $\gamma = 0.00$ |
| eccentricity [3]: | $X = 0.00$ | $Y = 52.86$ | $Z = 31.25$ |
| | $\alpha = 74.82$ | $\beta = 0.00$ | $\gamma = 0.00$ |
| eccentricity [4]: | $X = 0.00$ | $Y = -31.57$ | $Z = 32.02$ |
| | $\alpha = 93.58$ | $\beta = 0.00$ | $\gamma = 0.00$ |
| eccentricity [5]: | $X = 0.00$ | $Y = -48.97$ | $Z = 31.20$ |
| | $\alpha = 91.26$ | $\beta = 0.00$ | $\gamma = 0.00$ |
| eccentricity [6]: | $X = 0.00$ | $Y = -65.00$ | $Z = 31.11$ |
| | $\alpha = 89.11$ | $\beta = 0.00$ | $\gamma = 0.00$ |

Fourth Preferred Numerical Value Embodiment

| (Optical path 2) | | | | | |
|---|---|---|---|---|---|
| Surface Number Body Surface | Curvature Radius ∞ | Surface Gap ∞ | Eccentricity | Refractive Index | Abbe Number |
| 1 | ∞ (iris surface) | $d_1 = 0.00$ | | | |
| 2 | aspheric surface [1] | $d_2 = 0.00$ | eccentricity [1] | $n_1 = 1.5254$ | $v_1 = 56.2$ |
| 3 | FFS[1] | $d_3 = 0.00$ | eccentricity [2] | $n_2 = 1.5254$ | $v_2 = 56.2$ |
| 4 | aspheric surface [1] | $d_4 = 0.00$ | eccentricity [1] | $n_3 = 1.5254$ | $v_3 = 56.2$ |
| 5 | FFS[2] | $d_{10} = 0.00$ | eccentricity [3] | | |
| image plane | ∞ | $d_{11} = 0.00$ | eccentricity [7] | | |

-continued (Optical path 2)

| | | | |
|---|---|---|---|
| eccentricity [7]: | X = 0.00 | Y = 99.21 | Z = 69.36 |
| | α = 55.97 | β = 0.00 | γ = 0.00 |

Next, a fourth preferred numerical value embodiment according to the second embodiment described above will be shown (refer to FIGS. 5A and 5B).

The decentering optical system shown in the present preferred numerical value embodiment satisfies the Definition Equations (1) through (7) as shown in Table 1, and also further satisfies the Definition Equations (1b), (7a), and (8a).

Fifth Preferred Numerical Value Embodiment

Next, a fifth preferred numerical value embodiment which is related to the variant example of the decentering optical system according to the second embodiment described above will be shown (refer to FIGS. 6A and 6B).

(Optical path 1)

| Surface Number Body Surface | Curvature Radius | Surface Gap | Eccentricity | Refractive Index | Abbe Number |
|---|---|---|---|---|---|
| 1 | ∞ (iris surface) | $d_1 = 0.00$ | | | |
| 2 | aspheric surface [1] | $d_2 = 0.00$ | eccentricity [1] | $n_1 = 1.5254$ | $\nu_1 = 56.2$ |
| 3 | FFS[1] | $d_3 = 0.00$ | eccentricity [2] | $n_2 = 1.5254$ | $\nu_2 = 56.2$ |
| 4 | aspheric surface [1] | $d_4 = 0.00$ | eccentricity [1] | $n_3 = 1.5254$ | $\nu_3 = 56.2$ |
| 5 | FFS[2] | $d_5 = 0.00$ | eccentricity [3] | $n_4 = 1.5254$ | $\nu_4 = 56.2$ |
| image plane | ∞ | $d_6 = 0.00$ | eccentricity [4] | | |

| | | | |
|---|---|---|---|
| aspheric surface [1]: | $c = -624.60$ | $k = 0.00$ | $A = 5.0167 \times 10^{-7}$ |
| | $B = -3.9364 \times 10^{-10}$ | $C = 1.4172 \times 10^{-13}$ | $D = -1.8750 \times 10^{-17}$ |
| FFS[1]: | $C_4 = -2.2197 \times 10^{-3}$ | $C_6 = -2.0082 \times 10^{-3}$ | $C_8 = 3.2326 \times 10^{-7}$ |
| | $C_{10} = -3.510 \times 10^{-6}$ | $C_{11} = 7.2874 \times 10^{-8}$ | $C_{13} = -4.6980 \times 10^{-9}$ |
| | $C_{15} = 1.9121 \times 10^{-7}$ | $C_{17} = 1.1529 \times 10^{-9}$ | $C_{19} = 7.6365 \times 10^{-9}$ |
| | $C_{21} = 8.4152 \times 10^{-9}$ | $C_{22} = -2.1022 \times 10^{-11}$ | $C_{24} = 3.3172 \times 10^{-11}$ |
| | $C_{26} = 9.9211 \times 10^{-11}$ | $C_{28} = -1.4766 \times 10^{-10}$ | |
| FFS[2]: | $C_4 = -1.9171 \times 10^{-4}$ | $C_6 = -4.7100 \times 10^{-4}$ | $C_8 = 2.8489 \times 10^{-6}$ |
| | $C_{10} = -2.4160 \times 10^{-5}$ | $C_{11} = 1.6119 \times 10^{-6}$ | $C_{13} = -3.7161 \times 10^{-7}$ |
| | $C_{15} = -4.8999 \times 10^{-7}$ | $C_{17} = -1.3456 \times 10^{-7}$ | $C_{19} = -1.2498 \times 10^{-7}$ |
| | $C_{21} = 6.5390 \times 10^{-8}$ | $C_{22} = -1.0693 \times 10^{-8}$ | |
| eccentricity [1]: | X = 0.00 | Y = 0.50 | Z = 21.34 |
| | α = 7.76 | β = 0.00 | γ = 0.00 |
| eccentricity [2]: | X = 0.00 | Y = 1.25 | Z = 48.44 |
| | α = −19.04 | β = 0.00 | γ = 0.00 |
| eccentricity [3]: | X = 0.00 | Y = 52.65 | Z = 31.50 |
| | α = 74.83 | β = 0.00 | γ = 0.00 |
| eccentricity [4]: | X = 0.00 | Y = −16.49 | Z = 31.74 |
| | α = 85.00 | β = 0.00 | γ = 0.00 |

(Optical path 2)

| Surface Number Body Surface | Curvature Radius | Surface Gap | Eccentricity | Refractive Index | Abbe Number |
|---|---|---|---|---|---|
| 1 | ∞ (iris surface) | $d_1 = 0.00$ | | | |
| 2 | aspheric surface [1] | $d_2 = 0.00$ | eccentricity [1] | $n_1 = 1.5254$ | $\nu_1 = 56.2$ |
| 3 | FFS[1] | $d_3 = 0.00$ | eccentricity [2] | $n_2 = 1.5254$ | $\nu_2 = 56.2$ |
| 4 | aspheric surface [1] | $d_4 = 0.00$ | eccentricity [1] | $n_3 = 1.5254$ | $\nu_3 = 56.2$ |
| 5 | FFS[2] | $d_5 = 0.00$ | eccentricity [3] | | |
| image plane | ∞ | $d_8 = 0.00$ | eccentricity [5] | | |

| | | | |
|---|---|---|---|
| eccentricity [5]: | X = 0.00 | Y = 88.81 | Z = 60.67 |
| | α = 57.74 | β = 0.00 | γ = 0.00 |

The decentering optical system shown in the present preferred numerical value embodiment satisfies the Definition Equations (1) through (7) as shown in Table 1, and also further satisfies the Definition Equations (1b) and (7a).

The above-explained decentering optical system and optical system according to the present invention will be summarized below.

A decentering optical system of the present invention is a decentering optical system which takes a substantially parallel beam as input light, including a prism having a medium whose refractive index is greater than 1, and four optical surfaces disposed at boundary surfaces of the medium so as to be mutually decentering or to slant. The four optical surfaces form a light-incident surface through which the input light enters, at least two internal-reflective surfaces which reflect internally the input light entering inside, a splitting surface which splits an optical path of the input light reflected by any one of these internal-reflective surfaces, into a transmission optical path and a reflection optical path, and a transmitting surface which emits the input light traveling along the reflection optical path towards an exterior. Real images are formed along each of the transmission optical path and the reflection optical path.

According to the decentering optical system, it is possible to configure a splitting optical system in which the input light is internally reflected twice after passing thought the light-incident surface, and then is divided by the splitting surface into a light traveling along the transmission optical path and light traveling the reflection optical path and is emitted from the transmitting surface, thereby forming real images upon each of the transmission optical path and the reflection optical path. In this splitting optical system, since the four optical surfaces are unitarily formed within the prism, laborious operations such as alignments between and positioning of the optical surfaces during assembling become unnecessary. Thus, it is possible to arrange the four optical surfaces easily.

Therefore, the decentering optical system can be utilized for an application endowed with a sophisticated functionality, such as, for example, free-space optical communications in which information signals are detected from reception light at one optical path while performing positional detection of the reception light at another optical path, thereby performing tracking operations of tracking light.

In this splitting optical system, through each optical path, aberration compensation is performed by a combination of at least three or four optical surfaces, and through the aberration compensation, internal reflections are performed at least twice within boundary faces of a medium whose refractive index is greater than 1. A power of the internal reflective surfaces is multiplied by the refractive index of the medium, thereby becoming a comparatively large value. Thus, curvatures of the internal reflective surfaces can be comparatively small. Therefore, it becomes possible to obtain a comparatively clear imaging optical system which has a satisfactory imaging performance by suppressing the produced amount of aberration.

In addition, within a reflection optical path, since the internal reflections are performed at least twice and thereafter the reflection at the splitting surface occurs, folding up will be performed at least three times. Therefore it becomes possible to make the optical path compact even though the optical length is long. Accordingly, it is possible to make the imaging optical system compact even though the optical path length thereof is long.

According to the decentering optical system explained above, since it configures a splitting optical system with a prism having four optical surfaces including at least two internal reflective surfaces and a splitting surface, it is possible to obtain an optical system which can realize multifunction. In addition, it is possible to make it compact by folding up the optical path, even in the case in which the focal length is comparatively long.

It should be understood that, in the present invention, "optical surface" means that appropriate processing is carried out upon a surface such as a body surface or a boundary surface of the medium, and the surface is processed so as to obtain an optical operation such as, from the macro point of view, reflection, refraction, interference, polarization or the like of a luminous flux. In other words, it refers to a generic term for an optical element which has a surface which an ordinary skilled person would term, for example, a reflective surface, a transmission surface, a refracting surface, a lens surface, a Fresnel lens surface, a prism surface, a filter surface, a polarizing surface, an optical surface, or the like. Accordingly, when counting the number of optical surfaces, it is not intended that each boundary surface such as a multi-layer boundary surface in a coating, which performs a micro-type optical operation, should be counted.

It may be arranged such that when the four optical surfaces are defined, in order of appearance from the first time along one optical path in which the input light travels, as a first surface, a second surface, a third surface, and a fourth surface, if it is configured that: the first surface forms the light-incident surface and one of the internal-reflective surfaces; the second surface forms another of the internal-reflective surfaces; the third surface forms the splitting surface; and the fourth surface forms the transmitting surface, the one optical path includes an optical path in which the input light passing through the first surface is reflected internally by the second surface and travels towards the first surface, and then is reflected internally by the first surface and travels towards the third surface.

In this case, by internally reflecting at the second surface and the first surface after passing through the first surface, it is possible to perform satisfactory aberration compensation.

By combining, for example, the first surface endowed with a negative power and the second surface endowed with a positive power, it is possible to satisfactorily compensate the spherical aberration and the coma aberration.

In addition, in this case, it is desirable that the internal reflection at the first surface is performed at an angle equal to or greater than a critical angle. By performing this, since the internal reflection is realized by totally reflections, it is not necessary to provide a reflective coating. Accordingly, light loss at the incident surface due to the reflective coating will not occur, and this is convenient for serving as both the incident surface and the internal reflective surface.

In addition, by performing the internal reflection at an angle equal to or greater than the critical angle, the reflection angle will be large, and as a result, the optical path will be folded up at a large angle with respect to the incident light. Therefore, it is possible to make the prism comparatively thinner.

At least two of the four optical surfaces may be formed by rotationally asymmetric surfaces.

In this case, if the axial principal ray which passes through the center of the entrance pupil of the decentering optical system and arrives at the imaging surface center is incident eccentrically with respect to the decentering optical system, then it becomes possible to compensate decentering aberration of the trapezoidal deformation of the image caused by the eccentricity and inclination of the image surface and the like.

It may be arranged such that: the real image includes a first real image formed at an exterior of the prism along the transmission optical path, and a second real image formed at an interior of the prism along the reflection optical path; and light emitted from the transmitting surface after forming the second real image becomes substantially parallel light, thereby forming an exit pupil at the exterior of the prism.

In this case, the above-mentioned light forms substantially parallel light and is emitted, after forming the second real image, and thereafter forms an exit pupil at the exterior of the prism. Accordingly, by making the exit pupil position to a pupil position of an observer, it can be applied to observing a virtual image which is enlarged by the decentering optical system, that is, to a so-called telescope.

In addition, in the case in which an optical element such as, for example, a reflective mirror is provided at the exit pupil position, even if the angle of incidence of the incident light changes, the luminous flux will be kept within the exit pupil. Accordingly, since the optical surface of the optical element can be comparatively small, it is possible to make the optical element compact. As a result, it is possible to configure a compact decentering optical system while having a multifunction.

Moreover, in this case, the exit pupil is desirably formed in the close proximity of the transmission surface. By doing this, when arranging the optical element, it could be arranged so as to be close to the transmission surface, thereby enabling a more compact configuration.

The decentering optical system may further include a light-condensing element disposed upon an optical path after forming the exit pupil, and a light-receiving device disposed at a condensing position of the light-condensing element.

In this case, since the light which is split at the splitting surface will be condensed onto the light-receiving device by the light-condensing element, it is possible to detect the light which is split at the splitting surface, upon the light-receiving device. For example, by arranging a light deviation element such as a Galvano mirror at the exit pupil, and by arranging a PD (Photo Diode) as the light-receiving device, it becomes possible to detect by the light-receiving device a deviation in the direction due to the change in the image angle of the incident light, and to compensate the inclination of the incident light by driving the light deflection element so as to cancel the change in the image angle.

When a paraxial focal length is termed F, and an entrance pupil diameter is termed D, the following Equation (1) may be satisfied:

$$1 \leq F/D \leq 10 \tag{1}$$

In this case, since the range of F/D satisfies the Equation (1), it is possible to make the decentering optical system in a state having a satisfactory balance.

In other words, if the ratio F/D becomes large and exceeds the upper limit value of 10, then, since the length of the optical path with respect to the entrance pupil diameter D becomes too long, the prism becomes large, or this becomes an optical system of which the back focus is large, so that it is not possible to obtain a compact optical system. On the other hand, if the ratio F/D becomes smaller than the lower limit value of 1, then the luminous flux diameter of the incident light becomes large with respect to the paraxial focal length F, and the NA (Numerical Aperture) becomes large. As a result, the spherical aberration and the coma aberration and so on become large, and it becomes difficult to perform aberration compensation. Thus, by employing a value between them, it becomes possible to avoid the problems described above, and to obtain a decentering optical system having a satisfactory balance.

Moreover, it would be desirable for the range of the ratio F/D to be kept within a narrower range, in order to improve the balance of the decentering optical system. For example, the upper limit value is desirably 6 or 4, while the lower limit value is desirably 1.1 or 1.2. For example, it is desirable to satisfy $$1.1 \leq F/D \leq 6 \tag{1a}$$

and it is more desirable to satisfy $$1.2 \leq F/D \leq 4 \tag{1b}$$

An optical system of the present invention may include a light-receiving device which receives substantially parallel light entering from an exterior thereof, as input light, wherein the light-receiving device includes the above-mentioned decentering optical system.

According to this optical system, since it is equipped with the above-mentioned decentering optical system within the light-receiving device, the same operation and the same advantage can be obtained as the ones of the decentering optical system of the present invention. That is, it is possible to obtain an optical system which is small and be able to realize multifunction. As for an example of this kind of optical system, it is possible to show, for example, a light transmitting and receiving device which also serves as a light-receiving device or a light transmitting device for space communication, which has a tracking function, a telescope, and an observation system which focuses onto a focusing surface.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A decentering optical system which takes a substantially parallel beam as input light, comprising: a prism having a medium whose refractive index is greater than 1; and four optical surfaces disposed at boundary surfaces of the medium so as to be mutually decentering or to slant, wherein:

the four optical surfaces form: a light-incident surface through which the input light enters; at least two internal-reflective surfaces which reflect internally the input light entering inside; a splitting surface which splits an optical path of the input light reflected by any one of these internal-reflective surfaces, into a transmission optical path and a reflection optical path; and a transmitting surface which emits the input light traveling along the reflection optical path towards an exterior; and real images are formed along each of the transmission optical path and the reflection optical path.

2. The decentering optical system according to claim 1, wherein when the four optical surfaces are defined, in order of appearance from the first time along one optical path in which the input light travels, as a first surface, a second surface, a third surface, and a fourth surface, if it is configured such that: the first surface forms the light-incident surface and one of the internal-reflective surfaces; the second surface forms another of the internal-reflective surfaces; the third surface forms the splitting surface; and the fourth surface forms the transmitting surface, the one optical path includes an optical path in which the input light passing through the first surface is reflected internally by the second surface and travels towards the first surface, and then is reflected internally by the first surface and travels towards the third surface.

3. The decentering optical system according to claim 1, wherein at least two of the four optical surfaces are formed by rotationally asymmetric surfaces.

4. The decentering optical system according to claim 1, wherein:

the real images include a first real image formed at an exterior of the prism along the transmission optical path, and a second real image formed at an interior of the prism along the reflection optical path; and light emitted from the transmitting surface after forming the second real image becomes substantially parallel light, thereby forming an exit pupil at the exterior of the prism.

5. The decentering optical system according to claim 4, further comprising:

a light-condensing element disposed on optical path after forming the exit pupil; and a light-receiving device disposed at a condensing position of the light-condensing element.

6. The decentering optical system according to claim 1, wherein when a paraxial focal length is termed F, and an entrance pupil diameter is termed D, the following Equation (1) is satisfied:

$$1 \leq F/D \leq 10 \tag{1}.$$

7. An optical system comprising a light-receiving device which receives substantially parallel light entering from an exterior thereof, as an input light, wherein the light-receiving device includes the decentering optical system according to claim 1.

* * * * *

UNITED STATES PATENT AND TRADEMARK OFFICE
CERTIFICATE OF CORRECTION

| | | |
|---|---|---|
| PATENT NO. | : 7,113,349 B2 | Page 1 of 1 |
| APPLICATION NO. | : 11/210746 | |
| DATED | : September 26, 2006 | |
| INVENTOR(S) | : Koichi Takahashi | |

It is certified that error appears in the above-identified patent and that said Letters Patent is hereby corrected as shown below:

Column 27, lines 41-49, MOVE
"Third Preferred Numerical Value Embodiment

Next, a third Preferred numerical value embodiment which is related to the second variant example of the decentering optical system according to the first embodiment described above will be shown (refer to FIGS. 4A and 4B)" to Column 27, line 7 above the (Optical Path 1) table;

Column 29, line 51, MOVE "Fourth Preferred Numerical Value Embodiment" to Column 29, line 7 above the (Optical Path 1) table;

Column 31, lines 10-12, MOVE "Next, a fourth preferred numerical value embodiment according to the second embodiment described above will be shown (refer to FIGS. 5A and 5B)" to Column 29, line 8 above the (Optical Path 1) table.

Signed and Sealed this

Twenty-fifth Day of September, 2007

JON W. DUDAS
*Director of the United States Patent and Trademark Office*